United States Patent
Nishi et al.

(10) Patent No.: US 9,601,924 B2
(45) Date of Patent: Mar. 21, 2017

(54) ELECTRICAL POWER CONTROL DEVICE, ELECTRICAL POWER CONTROL METHOD, AND RECORDING MEDIUM

(71) Applicant: FUJITSU LIMITED, Kawasaki-shi, Kanagawa (JP)

(72) Inventors: Hidetaka Nishi, Itoshima (JP); Koki Mie, Fukuoka (JP); Yuji Takahashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 831 days.

(21) Appl. No.: 14/036,055

(22) Filed: Sep. 25, 2013

(65) Prior Publication Data

US 2014/0025218 A1 Jan. 23, 2014

Related U.S. Application Data

(63) Continuation of application No. PCT/JP2012/055146, filed on Feb. 29, 2012.

(30) Foreign Application Priority Data

Mar. 30, 2011 (JP) ................................ 2011-076750

(51) Int. Cl.
*G06F 1/26* (2006.01)
*H02J 3/06* (2006.01)
(Continued)

(52) U.S. Cl.
CPC ........ *H02J 3/06* (2013.01); *H02J 3/28* (2013.01); *H02J 13/0062* (2013.01);
(Continued)

(58) Field of Classification Search
None
See application file for complete search history.

(56) References Cited

U.S. PATENT DOCUMENTS

2001/0005802 A1* 6/2001 Arita ..................... G06Q 50/06
700/286
2010/0023174 A1 1/2010 Nagata et al.

FOREIGN PATENT DOCUMENTS

JP 11-146560 5/1999
JP 2002-044870 2/2002
(Continued)

OTHER PUBLICATIONS

Japanese Office Action mailed Dec. 2, 2014 for corresponding Japanese Patent Application No. 2011-076750, with Partial English Translation, 5 pages.

(Continued)

*Primary Examiner* — Sean Shechtman
(74) *Attorney, Agent, or Firm* — Fujitsu Patent Center

(57) ABSTRACT

An electrical power control device is installed in each location in which an electric power generation facility and an electrical power storage facility are provided. The electrical power control device includes the processor that executes a process. The process includes storing therein, in an associated manner for each location, an evaluation value related to the electrical power transmission load of another location and the electrical power balance in the other location. The process includes selecting, based on the evaluation value and the electrical power balance stored in a storage when the electrical power balance in a subject location is less than a predetermined threshold, another location as the request destination of electrical power transmission. The process includes sending, to the other location selected at the selecting, a request indicating that electrical power needs to be transmitted from the other location to the subject location.

10 Claims, 22 Drawing Sheets

(51) Int. Cl.
*H02J 3/28* (2006.01)
*H02J 13/00* (2006.01)
(52) U.S. Cl.
CPC ......... *Y02E 60/722* (2013.01); *Y02E 60/7838* (2013.01); *Y04S 10/14* (2013.01); *Y04S 40/124* (2013.01)

(56) References Cited

FOREIGN PATENT DOCUMENTS

| | | |
|---|---|---|
| JP | 2003-324850 | 11/2003 |
| JP | 2004-129499 | 4/2004 |
| WO | 2008-117392 | 10/2008 |

OTHER PUBLICATIONS

Sho Shimizu, et al., "A study on power optimization with inter-zone optimization and inter-area optimization", <http://biblio.yamanaka.ics.keio.ac.jp/file/shimizu_ieice_zenkoku_bs_08_010.pdf>, The Institute of Electronics, Department of Information and Communication Engineers (IEICE) General Conference, Mar. 16, 2010, Translation of the relevant parts.
Masahide Yamaguchi, "Battery technology in the new energy field", <http://www.meti.go.jp/committee/materials/downloadfiles/g80423b04j.pdf>, GS Yuasa Power Supply, Ltd., Mar. 14, 2008, Translation of the relevant parts.
International Search Report, mailed in connection with PCT/JP2012/055146 and mailed Jun. 12, 2012.

\* cited by examiner

FIG.5

| | ELECTRICAL POWER CONSUMPTION (KILOWATT) | AMOUNT OF GENERATED ELECTRICAL POWER (KILOWATT/HOUR) | AMOUNT OF STORED ELECTRICAL POWER (MILLIAMPERE/HOUR) |
|---|---|---|---|
| ELECTRICAL POWER | 0.500 | 1.000 | 1,000 |

FIG.6

| BASE LOCATION NAME (HOME) | ELECTRICAL POWER CONSUMPTION (KILOWATT) | AMOUNT OF GENERATED ELECTRICAL POWER (KILOWATT/HOUR) | AMOUNT OF STORED ELECTRICAL POWER (MILLIAMPERE/HOUR) | DISTANCE (HOP COUNT) | BALANCE |
|---|---|---|---|---|---|
| $a_m$ | 0.500 | 1.000 | 1,000 | 4 | 0.500 |
| $b_1$ | 0.400 | 1.200 | 2,000 | 2 | 0.800 |
| ⋮ | ⋮ | ⋮ | ⋮ | ⋮ | ⋮ |
| $k_1$ | 0.100 | 1.000 | 3,000 | 1 | 0.900 |
| ⋮ | ⋮ | ⋮ | ⋮ | ⋮ | ⋮ |
| STORAGE 1 | — | — | 100,000 | 4 | — |

FIG.7

| AD HOC HEADER | BASE LOCATION NAME | ELECTRICAL POWER CONSUMPTION | AMOUNT OF GENERATED ELECTRICAL POWER | AMOUNT OF STORED ELECTRICAL POWER | RELAY INFORMATION | |
|---|---|---|---|---|---|---|
| ... | $b_1$ | 0.400 | 1.200 | 2,000 | $b_1 \rightarrow k_1, a_1, b_m$ | ← $P_1$ |
| ... | $k_1$ | 0.100 | 1.000 | 3,000 | $k_1 \rightarrow n_1, b_1$ | ← $P_2$ |
| ... | $n_1$ | 0.500 | 1.000 | 1,000 | $n_1 \rightarrow k_1$ | ← $P_3$ |

FIG.8

| AD HOC HEADER | BASE LOCATION NAME | ELECTRICAL POWER CONSUMPTION | AMOUNT OF GENERATED ELECTRICAL POWER | AMOUNT OF STORED ELECTRICAL POWER | RELAY INFORMATION | |
|---|---|---|---|---|---|---|
| ... | $b_1$ | 0.400 | 1.200 | 2,000 | $b_1 \rightarrow k_1, a_1, b_m$ | ← $P_1$ |
| ... | $k_1$ | 0.100 | 1.000 | 3,000 | $k_1 \rightarrow n_1, b_1$ | ← $P_2$ |

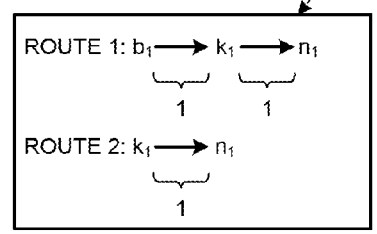

ROUTE 1: $b_1 \rightarrow k_1 \rightarrow n_1$
           1      1
ROUTE 2: $k_1 \rightarrow n_1$
           1

FIG.9

| | ON/OFF CONTROL PATTERN OF SWITCH | SWITCH NUMBER | | | | | | | | | | | | | | | | |
|---|---|---|---|---|---|---|---|---|---|---|---|---|---|---|---|---|---|---|
| | | $S_1$ | $S_2$ | $S_3$ | $S_4$ | $S_5$ | $S_6$ | $S_7$ | $S_8$ | $S_9$ | $S_{10}$ | $S_{11}$ | $S_{12}$ | $S_{13}$ | $S_{14}$ | $S_{15}$ | $S_{16}$ | $S_{17}$ |
| 1 | ELECTRICAL POWER CONSUMPTION IN SUBJECT HOME IS COVERED BY ELECTRICAL POWER SUPPLIED BY SELF ELECTRICAL POWER GENERATING DEVICE | | | | | | | | | | | | | | | O | | |
| 2 | ELECTRICAL POWER CONSUMPTION IN SUBJECT HOME IS COVERED BY ELECTRICAL POWER STORED IN BATTERY IN SUBJECT HOME | | | | | | | | | | | | | | | | | O |
| 3 | EXCESSIVE ELECTRICAL POWER IN SELF ELECTRICAL POWER GENERATING DEVICE IS STORED IN BATTERY | | | | | | | | | | | | | | | O | | O |
| 4 | ELECTRICAL POWER IS RECEIVED FROM (1) OR ELECTRICAL POWER STORAGE STATION | | | | | | | | | | | O | | | | | | |
| 5 | ELECTRICAL POWER IS RECEIVED FROM (2) OR ELECTRICAL POWER STORAGE STATION | | | | | | | | | | | | O | | | | | |
| 6 | ELECTRICAL POWER IS RECEIVED FROM (3) OR ELECTRICAL POWER STORAGE STATION | | | | | | | | | | | | | O | | | | |
| 7 | ELECTRICAL POWER IS RECEIVED FROM (4) OR ELECTRICAL POWER STORAGE STATION | | | | | | | | | | | | | | O | | | |
| 8 | ELECTRICAL POWER IS SUPPLIED VIA GENERAL ELECTRICAL POWER TRANSMISSION NETWORK | | | | | | | | | | | | | | | | O | |
| 9 | ELECTRICAL POWER GENERATED FROM ELECTRICAL POWER GENERATING DEVICE IS TRANSMITTED TO (1) | O | | | | | | | | | | | | | | O | | |
| 10 | ELECTRICAL POWER GENERATED FROM ELECTRICAL POWER GENERATING DEVICE IS TRANSMITTED TO (2) | | O | | | | | | | | | | | | | O | | |
| 11 | ELECTRICAL POWER GENERATED FROM ELECTRICAL POWER GENERATING DEVICE IS TRANSMITTED TO (3) | | | O | | | | | | | | | | | | O | | |
| 12 | ELECTRICAL POWER GENERATED FROM ELECTRICAL POWER GENERATING DEVICE IS TRANSMITTED TO (4) | | | | O | | | | | | | | | | | O | | |
| 13 | ELECTRICAL POWER IN BATTERY IS SUPPLIED TO (1) | | | | | | | | | | | O | | | | | | O |
| 14 | ELECTRICAL POWER IN BATTERY IS SUPPLIED TO (2) | | | | | | | | | | | | O | | | | | O |
| 15 | ELECTRICAL POWER IN BATTERY IS SUPPLIED TO (3) | | | | | | | | | | | | | O | | | | O |
| 16 | ELECTRICAL POWER IN BATTERY IS SUPPLIED TO (4) | | | | | | | | | | | | | | O | | | O |
| 17 | ONLY RELAY ELECTRICAL POWER FROM (1) TO (2) | | | | | O | | | | | | | | | | | | |
| 18 | ONLY RELAY ELECTRICAL POWER FROM (1) TO (3) | | | | | | O | | | | | | | | | | | |
| 19 | ONLY RELAY ELECTRICAL POWER FROM (1) TO (4) | | | | | | | O | | | | | | | | | | |
| 20 | ONLY RELAY ELECTRICAL POWER FROM (2) TO (3) | | | | | | | | O | | | | | | | | | |
| 21 | ONLY RELAY ELECTRICAL POWER FROM (2) TO (4) | | | | | | | | | O | | | | | | | | |
| 22 | ONLY RELAY ELECTRICAL POWER FROM (3) TO (4) | | | | | | | | | | O | | | | | | | |
| 23 | RELAY ELECTRICAL POWER FROM (2) TO (3) WHILE ELECTRICAL POWER IS BEING SUPPLIED TO (5) FROM (1) OR ELECTRICAL POWER STORAGE STATION | | | | | | | | O | | | O | | | | | | |
| 24 | RELAY ELECTRICAL POWER FROM (1) TO (2) WHILE ELECTRICAL POWER CONSUMED IN (5) IS BEING COVERED BY ELECTRICAL POWER GENERATED BY ELECTRICAL POWER GENERATING DEVICE IN (5) | | | | | O | | | | | | | | | | O | | |

| BASE LOCATION NAME (HOME) | ELECTRICAL POWER CONSUMPTION (KILOWATT) | AMOUNT OF GENERATED ELECTRICAL (KILOWATT/HOUR) | AVAILABLE SUPPLY AMOUNT (MILLIAMPERE/ HOUR) | DISTANCE (HOP COUNT) | BALANCE |
|---|---|---|---|---|---|
| STORAGE 1 | – | – | 100,000 | 8 | – |
| STORAGE 2 | – | – | 1,000,000 | 10 | – |
| STORAGE 3 | – | – | 1,000 | 5 | – |
| STORAGE 4 | – | – | 500,000 | 6 | – |

ELECTRICAL POWER CONTROL DEVICE, ELECTRICAL POWER CONTROL METHOD, AND RECORDING MEDIUM

CROSS-REFERENCE TO RELATED APPLICATIONS

This application is based upon and claims the benefit of priority of the prior Japanese Patent Application No. 2011-076750, filed on Mar. 30, 2011, the entire contents of which are incorporated herein by reference.

This application is a continuation of International Application No. PCT/JP2012/055146, filed on Feb. 29, 2012 and designating the U.S., the entire contents of which are incorporated herein by reference.

FIELD

The embodiments discussed herein are directed to an electrical power control device, an electrical power control program, and an electrical power control method.

BACKGROUND

Electrical power networks used in recent years have a network structure that have multiple electrical power supply sources, such as electrical power companies and homes equipped with a photovoltaic power generation facility; therefore, it is difficult to manage the supply and demand of electrical power. Consequently, network structures have been developed to efficiently control the electrical power networks and to increase the efficiency of electrical power usage over the entirety of each electrical power network.

For example, there is a technology that controls the electrical power supply and demand for each area in an electrical power network. FIG. 26 is a schematic diagram illustrating an example of an electrical power network. As illustrated in FIG. 26, with this technology, an electrical power network $A_1$ is divided into multiple areas $A_2$ called areas and multiple areas $A_3$ called zones. Furthermore, with the technology that controls the electrical power supply and demand, a smart meter is installed in each home in a zone. This first smart meter transmits, regularly to another smart meter in the same zone to which the first smart meter belongs, information related to an electrical power balance including both the available amount of electrical power supply at this point and the amount of electrical power consumption. Furthermore, when receiving information related to an electrical power balance from another smart meter, the first smart meter transmits a reply based on the information related to its own electrical power balance. In this way, the technology that controls the electrical power supply and demand performs a matching of electrical power supply and demand in a zone, thereby controlling the electrical power supply and demand in the zone.

Furthermore, with the technology that controls electrical power supply and demand, as illustrated in FIG. 26, an area broker $D_1$ that manages the electrical power supply and demand in an area is installed in each area. The area broker $D_1$ recognizes, based on information related to the supply and demand balance of the electrical power aggregated in each zone, an excess or deficiency of electrical power related to each zone in an area. Then, by determining the adjustment of electrical power between the zones, the area broker $D_1$ controls the electrical power supply and demand in an area.

Furthermore, as a technology related to controlling electrical power supply and demand, there is a technology that performs, by using an electrical power storage station, energy management including supply and demand adjustment in a short time, supply and demand adjustment in accordance with a time zone, such as in the daytime or in the evening, and supply and demand adjustment in accordance with the weather, such as when the weather is fair or it is raining.

Non-Patent Document 1: Sho Shimizu, et al., "A study on power optimization with inter-zone optimization and inter-area optimization", Mar. 16, 2010 The Institute of Electronics, Information and Communication Engineers (IEICE) General Conference, Mar. 16, 2010

Non-Patent Document 2: Masahide Yamaguchi, GS Yuasa Power Supply, Ltd., "battery technology in the new energy field", March 14

However, with the technology disclosed in the Non-Patent Document 1, a zone is optimized by performing an instant matching in a locality (electrical power is immediately supplied between homes), which is a basic method. Consequently, with the technology disclosed in the Non-Patent Document 1, it is difficult to optimize any large imbalance of the electrical power supply and demand in a zone or to optimize the variation in electrical power usage in the time axis direction. For example, if the electrical power usage in a home exceeds the amount of electrical power supply, it is difficult to immediately detect the insufficiency of electrical power and promptly supply electrical power. Furthermore, an electrical power generating device, such as a photovoltaic power generator, installed in a home transmits electrical power by using a low-voltage direct current power supply. When sending electrical power by using a low-voltage direct current power supply, the loss of electrical power during transmission increases in proportion to the distance. However, with the above-described technology that controls the electrical power supply and demand, when electrical power is transmitted, the location relationship between the side that supplies electrical power and the side that receives the supply of the electrical power is not considered. Consequently, there is a problem in that the side that can supply electrical power does not immediately detect the insufficiency of electrical power on the side that receives the supply of the electrical power, and furthermore, the loss of electrical power when the electrical power is transmitted becomes large. Furthermore, with the technology using the above-described electrical power storage station, when performing energy management, such as the supply and demand adjustment, the location relationship between the side that supplies electrical power and the side that receives the supply of the electrical power is not considered; therefore, a delay may occurs until the electrical power is transmitted and a loss of electrical power when the electrical power is transmitted may occur.

Furthermore, if an electrical power storage station is accommodated in an electrical power network, the loss of electrical power may sometimes be low if electrical power is supplied from the electrical power storage station. However, because the above-described technology that controls the electrical power supply and demand is considered based on the assumption that electrical power is demanded and supplied between homes, even if the electrical power storage station is accommodated in the electrical power network, the loss of electrical power when electrical power is transmitted is inevitable.

SUMMARY

According to an aspect of the embodiments, an electrical power control device is installed in each location in which an electric power generation facility and an electrical power storage facility are provided. The electrical power control device includes a memory; and a processor coupled to the memory, wherein the processor executes a process including: storing therein, in an associated manner for each location connected by using an electrical power transmission network and a communication network, an evaluation value related to the electrical power transmission load of another location and the electrical power balance in the other location; selecting, based on the evaluation value and the electrical power balance stored in a storage when the electrical power balance in a subject location is less than a predetermined threshold, another location as the request destination of electrical power transmission; and sending, to the other location selected at the selecting via the communication network, a request indicating that electrical power needs to be transmitted, via the electrical power transmission network, from the other location to the subject location.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a schematic diagram illustrating an example of meter read information;

FIG. 6 is a schematic diagram illustrating an example of path information according to the first embodiment;

FIG. 7 is a schematic diagram illustrating an example configuration of a packet;

FIG. 8 is a schematic diagram illustrating an example of a method of creating the path information;

FIG. 9 is a schematic diagram illustrating examples of on/off control patterns of switches;

DESCRIPTION OF EMBODIMENTS

Preferred embodiments will be explained with reference to accompanying drawings. The embodiments described below are only embodiments and the electrical power control device, the electrical power control program, and the electrical power control method disclosed in the present invention are not limited by the embodiments. Furthermore, the embodiments described below can be appropriately used in combination as long as the processes do not conflict with each other.

[a] First Embodiment

Configuration of a First Embodiment

Figure 1:
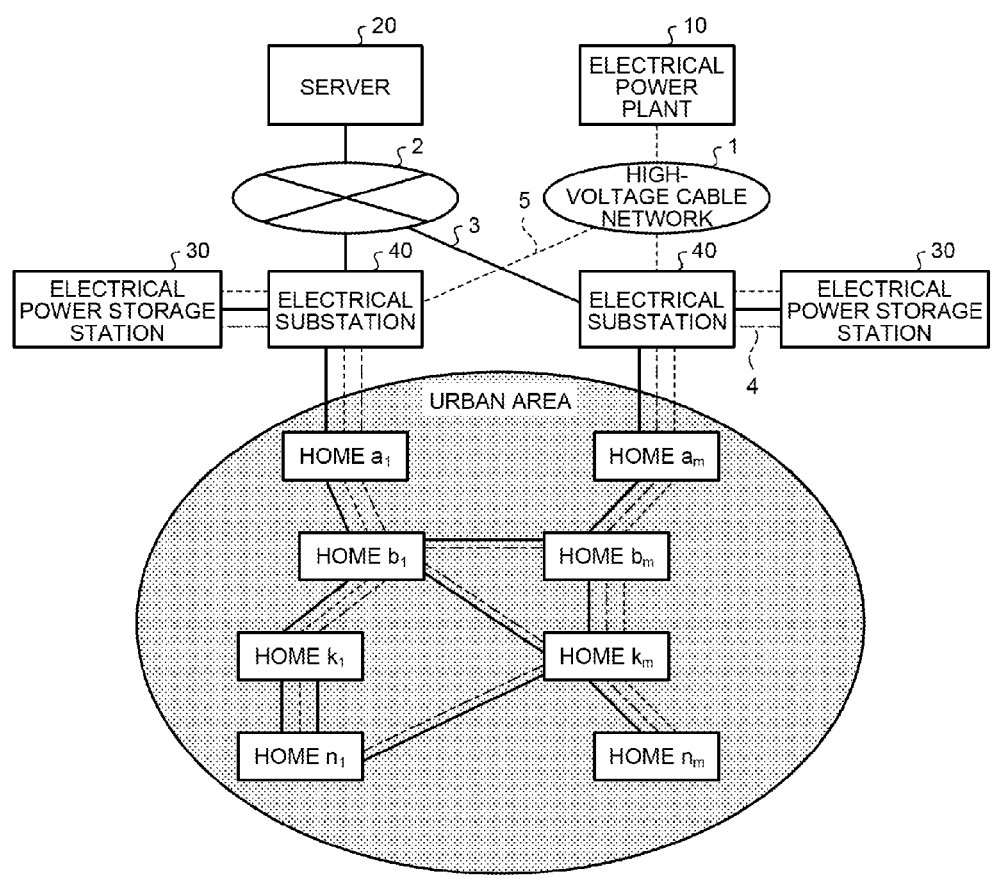
FIG. 1 is a schematic diagram illustrating the overall configuration according to a first embodiment.

FIG. 1 is a schematic diagram illustrating the overall configuration according to a first embodiment. As illustrated in FIG. 1, the overall configuration of the first embodiment accommodates an electrical power plant 10, a server 20, electrical power storage stations 30, electrical substations 40, and homes. Furthermore, in the first embodiment, a description will be given of a case in which each home covers the electrical power consumed by itself by using the electrical power that is generated by an electrical power generating device installed therein and electrical power supply and demand is performed between homes or between a home and another electrical power supply source in accordance with the electrical power balance (the balance of electrical power supply and demand) in the home.

The configuration of the electrical power system constituted by the electrical power plant 10, the electrical power storage stations 30, the electrical substations 40, and the like illustrated in FIG. 1 is only an example and the configuration is not limited thereto. Furthermore, for convenience of description, FIG. 1 illustrates one electrical power plant 10, one server 20, two electrical power storage stations 30, and two electrical substations 40; however, the number thereof is not limited thereto. Furthermore, for convenience of description, FIG. 1 illustrates eight homes, i.e., a home $a_1$, a home $a_m$, a home $b_1$, a home $b_m$, a home $k_1$, a home $k_m$, a home $n_1$, and a home $n_m$; however, the number of homes is not limited thereto.

As illustrated in FIG. 1, the electrical power plant 10 is connected to the electrical substation 40 via a high-voltage cable network 1. The electrical power plant 10 supplies electrical power to the electrical substations 40 via the high-voltage cable network 1. Furthermore, as illustrated in FIG. 1, the server 20 is connected, via a network 2, to a gateway (GW) device installed in the electrical substation 40. The server 20 performs communication, via the network 2, to exchange information related to the electrical power supply and demand among the electrical power storage stations 30, the electrical substations 40, and each of the homes.

Furthermore, as illustrated in FIG. 1, the electrical power storage stations 30 are connected to the electrical substations 40, respectively, via a communication network 3, a stored electrical power transmission network 4, and a general electrical power transmission network 5. The electrical power storage stations 30 performs communication, via the communication network 3, to exchange information related to the electrical power supply and demand among the server 20, the electrical substations 40, and each of the homes.

Furthermore, as illustrated in FIG. 1, the electrical substations 40 are connected to the server via the communication network 3. Furthermore, the electrical substations 40 are connected to the electrical power storage stations 30, respectively, via the communication network 3, the stored electrical power transmission network 4, and the general electrical power transmission network 5. Furthermore, the electrical substations 40 are connected to each of the homes via the communication network 3, the stored electrical power transmission network 4, and the general electrical power transmission network 5. The electrical substations 40 performs communication, via the communication network 3, to exchange information related to the electrical power supply and demand among the server 20, the electrical power storage stations 30, and each of the homes. The electrical substations 40 supplies, via the stored electrical power transmission network 4, the electrical power received from the electrical power storage station 30 to each of the homes. Furthermore, the electrical substation 40 supplies, via the general electrical power transmission network 5, the electrical power received from the electrical power plant 10 to each of the homes.

Furthermore, as illustrated in FIG. 1, information that is used to specify a home is attached to each of the homes. For example, as illustrated in FIG. 1, as the information used to specify each home, $a_1$, $a_m$, $b_1$, $b_m$, $k_1$, $k_m$, $n_1$, or $n_m$ are attached. In the description below, for example, the home to which "$a_1$" is attached is represented by a home $a_1$. Similarly to the other homes, a home is represented by a home $a_m$, a home $b_1$, a home $b_m$, a home $k_1$, a home $k_m$, a home $n_1$, or a home $n_m$. Furthermore, as illustrated in FIG. 1, the home $a_1$, the home $a_m$, the home $b_1$, the home $b_m$, the home $k_1$, the home $k_m$, the home $n_1$, and the home $n_m$ are connected to other homes or one of the electrical substations 40 via the communication network 3, the stored electrical power transmission network 4, the general electrical power transmission network 5, and the like. Each of the homes performs communication, via the communication network 3, to exchange information related to the electrical power supply and demand among the server 20, the electrical power storage stations 30, the electrical substations 40, and the other homes. Each of the homes receives a supply of electrical power from one of the electrical power storage stations 30 or the other home via the stored electrical power transmission network 4. Furthermore, each of the homes receives a supply of electrical power from the electrical power plant 10 via the general electrical power transmission network.

Figure 2:
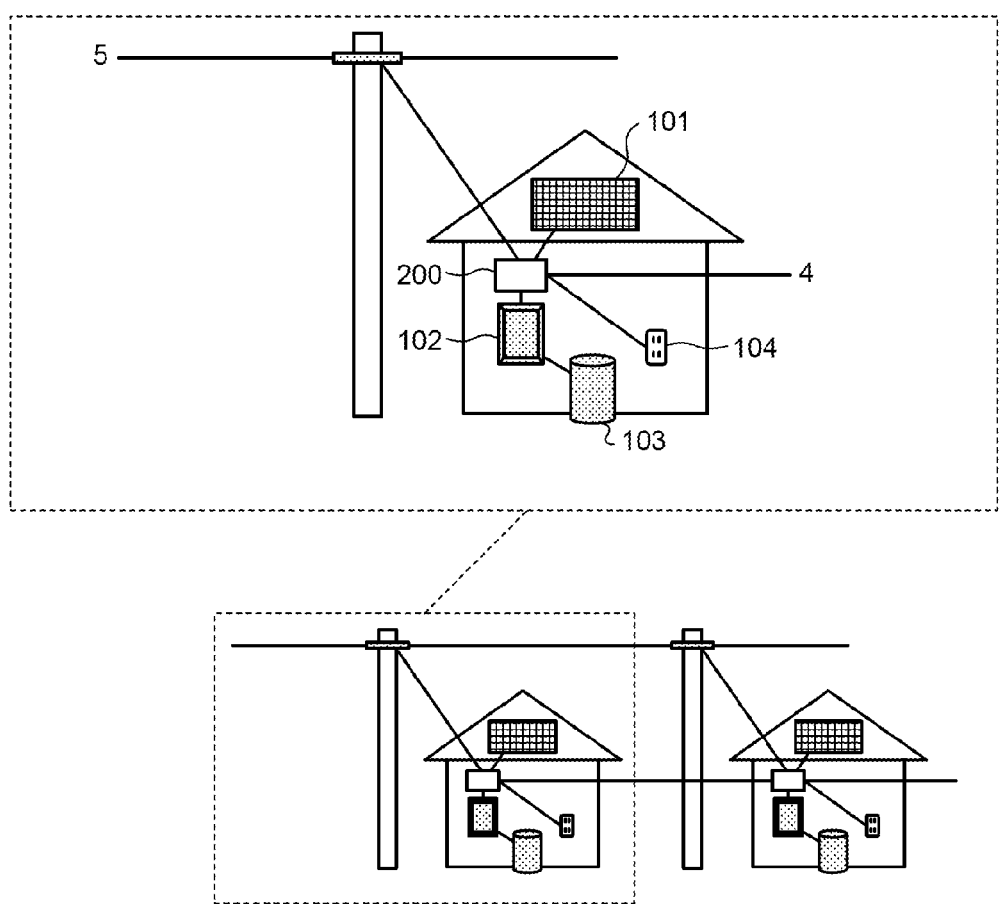
FIG. 2 is a schematic diagram illustrating a conceptual image of an electrical power transmission network.

In the following, a conceptual image of an electrical power transmission network will be described with reference to FIG. 2. FIG. 2 is a schematic diagram illustrating a conceptual image of an electrical power transmission network. As illustrated in FIG. 2, in each of the homes, a solar battery 101, a battery charger 102, a battery 103, a household power supply 104, and a smart meter 200 are installed. The solar battery 101 is connected to the smart meter 200. The battery charger 102 is connected to the smart meter 200 and the battery 103. The battery 103 is connected to the battery charger 102. The household power supply 104 is connected to the smart meter 200. The smart meter 200 is connected to the solar battery 101, the battery charger 102, and the household power supply 104 and is connected to the stored electrical power transmission network 4 and the general electrical power transmission network 5. The smart meter 200 monitors the electrical power balance in the home in which it is installed and performs a process related to the supply and demand of electrical power in accordance with the electrical power balance. In a home, electrical power supplied from the electrical power plant 10 via the general electrical power transmission network 5 can be used from the household power supply 104. Furthermore, in a home, the electrical power generated using the solar battery 101 is stored in the battery 103 by using the battery charger 102 and the electrical power stored in the battery 103 can be used via the household power supply 104.

Configuration of a Smart Meter

Figure 3:
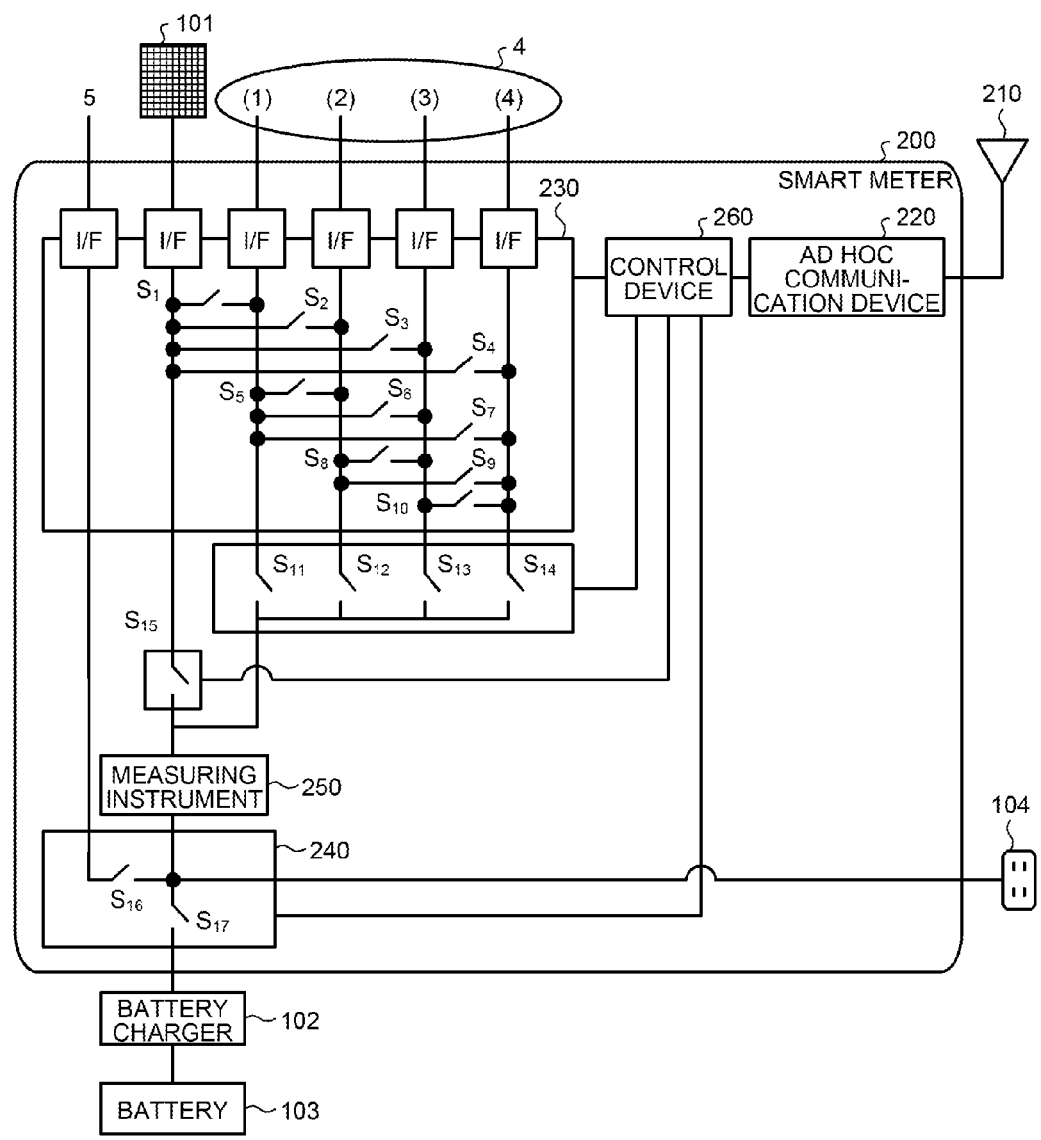
FIG. 3 is a block diagram illustrating the configuration of a smart meter.

In the following, the configuration of the smart meter will be described with reference to FIG. 3. For convenience of description, a description will be given of a process performed by the smart meter 200 installed in the home $n_1$ illustrated in FIG. 1. This same process is performed in the other homes. FIG. 3 is a block diagram illustrating the configuration of a smart meter.

As illustrated in FIG. 3, the smart meter 200 includes an antenna 210, an ad hoc communication device 220, an I/F 230 (hereinafter, referred to as an interface), a splitter 240, a measuring instrument 250, and a control device 260. The antenna 210 transmits a communication radio wave that is output from the ad hoc communication device 220 and receives the communication radio wave sent from another home. The ad hoc communication device 220 constructs a network with a smart meter that is installed in another home and performs communication, via this network, to exchange information related to the status of the electrical power balance. The network of which the ad hoc communication device 220 is a part an example of the communication network illustrated in FIG. 1. The interface 230 is a connecting unit that is connected to the stored electrical power transmission network 4, the solar battery 101, and the general electrical power transmission network 5. The splitter 240 switches the connection between the side with the battery 103 and the side with the household power supply 104. The measuring instrument 250 measures the electrical power consumption, the amount of generated electrical power, and the amount of stored electrical power in the home in which the smart meter 200 is installed. At this point, the measuring instrument 250 measures the amount of generated electrical power or the amount of stored electrical power depending on the connection of the switch that is switched by the control device 260, which will be described later. Furthermore, in FIG. 3, only one measuring instrument 250 is installed in the smart meter 200; however, the configuration is not limited thereto. For example, a measuring instrument that measures the electrical power consumption may also be arranged between the household power supply 104 and the splitter 240, a measuring instrument that measures the amount of generated electrical power may also be arranged between the solar battery 101 and the splitter 240, and a measuring instrument that measures the amount of stored electrical power may also be arranged between the battery charger 102 and the splitter 240.

Figure 4:
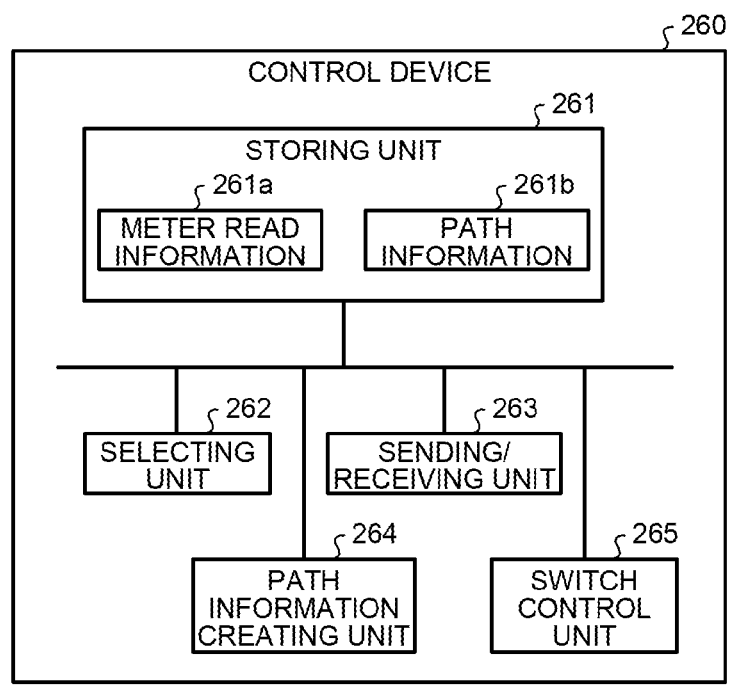
FIG. 4 is a block diagram illustrating the configuration of a control device.

The control device 260 is connected to the ad hoc communication device 220, the interface 230, the splitter 240, and each switch. Furthermore, the control device 260 monitors the electrical power balance in the home in which it is installed and performs a process in accordance with the state of the electrical power balance in the home in which it is installed. The electrical power balance mentioned here means the difference between the amount of generated electrical power and the electrical power consumption. In the following, the configuration of the control device 260 will be described with reference to FIG. 4. FIG. 4 is a block diagram illustrating the configuration of a control device.

As illustrated in FIG. 4, the control device 260 includes a storing unit 261, a selecting unit 262, a sending/receiving unit 263, a path information creating unit 264, and a switch control unit 265.

As illustrated in FIG. 4, the storing unit 261 stores therein meter read information 261*a* and path information 261*b*. Furthermore, the storing unit 261 is, for example, a semiconductor memory device, such as a random access memory (RAM) or a flash memory.

The meter read information 261*a* stored in the storing unit 261 is information on the electrical power consumption, the amount of generated electrical power, and the amount of stored electrical power that are measured by the measuring instrument 250 at a predetermined meter reading time. FIG. 5 is a schematic diagram illustrating an example of meter read information that is measured by the measuring instrument 250. FIG. 5 is a schematic diagram illustrating an example of meter read information. As illustrated in FIG. 5, the storing unit 261 stores therein, as the meter read information 261*a*, an electrical power consumption of "0.500 kilowatt", the amount of generated electrical power of "1.000 kilowatt/hour", and the amount of stored electrical power of "1,000 milliampere/hour". The storing unit 261 may also store therein all the pieces of the meter read information 261*a* as a log or store therein a new piece of meter read information 261*a* by overwriting an old piece of information.

The path information 261*b* stored in the storing unit 261 is information created by the path information creating unit 264, which will be described later, and stores therein, in an associated manner for each home, an evaluation value, which is related to the electrical power transmission load of another home, and the electrical power balance of that same home. The path information 261*b* stores therein, as an evaluation value related to the electrical power transmission load of the other home, the distance (hop count) based on the location relationship between a subject home and the other home. The electrical power transmission load increases as the distance increases. The information that is stored as the evaluation value related to the electrical power transmission load of the other home is not limited to a hop count. For example, location information constituted from the latitude and the longitude of the other home may also be used. Furthermore, as the evaluation value related to an electrical power transmission load of the other home, the difference between the voltage value obtained when electrical power is transmitted from the other home and the voltage value at the subject home when the electrical power is received from the other home that has transmitted the electrical power may also be used. In the following, an example of the path information 261*b* stored in the storing unit 261 will be described with reference to FIG. 6.

FIG. 6 illustrates an example of path information created by the smart meter 200 installed in the home $n_1$ illustrated in FIG. 1. FIG. 6 is a schematic diagram illustrating an example of path information according to the first embodiment. As illustrated in FIG. 6, the storing unit 261 stores therein, as the path information 261*b*, pieces of information on the base location name, the electrical power consumption, the amount of generated electrical power, the amount of stored electrical power, the distance (hop count), and the balance. The base location name is information that specifies each base location, such as a home or an electrical power storage station, in which electrical power is supplied and demanded. The electrical power consumption is information on the electrical power consumption that was measured at each base location. The amount of generated electrical power is information on the amount of generated electrical power that was measured at each base location. The amount of stored electrical power is information on the amount of stored electrical power that was measured at each base location. The distance (hop count) is information that specifies the distance between the base locations.

In FIG. 6, as the base location name, information "$a_m$", "$b_1$", and "$k_1$" uniquely attached to the respective homes and information "electrical power storage 1" that uniquely specifies the electrical power storage station illustrated in FIG. 1 are stored. Furthermore, in FIG. 6, for each base location, the electrical power consumed in a home measured in that home is stored. For example, "0.500 (kilowatt)" is stored for the base location "$a_m$". Furthermore, in FIG. 6, for each base location, the amount of generated electrical power in a home measured at that home is stored. For example, for the base location "$a_m$", "1.000 (kilowatt/hour)" is stored. Furthermore, in FIG. 6, for each base location, the amount of stored electrical power in a home stored in that home is stored. For example, for the base location "$a_m$", "1,000 (milliampere/hour)" is stored.

Furthermore, in FIG. 6, for each base location, the distance (hop count) that is the evaluation value related to the electrical power load between a given home and another home is stored. For example, for the base location "$a_m$", "4" is stored. The distance (hop count) illustrated in FIG. 6 is created by the path information creating unit 264, which will be described later, by using relay information included in a packet that is exchanged between base locations using ad hoc communication in order to obtain information related to the electrical power balance at the other home. For example, the distance (hop count) illustrated in FIG. 6 is information indicating the number of smart meters 200 that relay the packet and is information indicating the number of communication paths, such as the communication network 3, the stored electrical power transmission network 4, and the general electrical power transmission network 5 that connects the smart meter 200 installed in each of the homes. In the example illustrated in FIG. 1, if a packet is transmitted from the home $k_1$ to the home $n_1$, the distance (hop count) of the home $k_1$ from the home $n_1$ is "1". The relay information, which will be described later, is information that indicates the association relationship between the transmission source and the destination of a packet. It is conceivable that the number of cases in which the electrical power storage station 30 is newly introduced in an electrical power system is small, like that in a home. Therefore, for example, after the electrical power system illustrated in FIG. 1 has been constructed, the distance to the electrical power storage station 30 may also previously be calculated and included in the path information 261*b*; however, the distance may also be created by the path information creating unit 264.

Furthermore, in FIG. 6, for each base location, the balance that is the difference between the amount of generated electrical power and the electrical power consumption in a home (the value obtained by subtracting the electrical power consumption from the amount of generated electrical power) is stored. For the base location "$a_m$", "0.500" is stored. Furthermore, for the electrical power storage station 30, because self generation or self consumption is not obtained, the amount of stored electrical power is stored as the balance. Furthermore, the balance may also be calculated at the site where a packet is received or the balance may also previously be calculated at the transmission source of the packet.

A description will be given here by referring back to FIG. 4. If an electrical power balance at a subject home in which the smart meter 200 that includes the selecting unit 262 is installed is less than a predetermined threshold, then the selecting unit 262 selects another home as the destination of an electrical power transmission request. This selection is made based on both an evaluation value related to the electrical power transmission load of the other home and the electrical power balance at the other home. For example, the selecting unit 262 determines whether it is meter reading time of the electrical power consumption, the amount of generated electrical power, and the amount of stored electrical power at the subject home. If it is meter reading time at the subject home, the selecting unit 262 acquires meter read data on the electrical power consumption, the amount of generated electrical power, and the amount of stored electrical power measured by the measuring instrument 250 and then calculates an electrical power balance by subtracting the electrical power consumption from the amount of generated electrical power. A meter reading is performed at appropriate time intervals such that the electrical power supplied to the subject home does not become unstable. Furthermore, the selecting unit 262 stores the acquired meter read data in the storing unit 261 as the meter read information 261a; however, all of the pieces of meter read data may also be stored as a history or a piece of meter read data may also be stored by overwriting the previous piece of data to update it.

After calculating the electrical power balance, the selecting unit 262 performs an electrical power control process and then performs an electrical power supply destination determining process. In the description below, it is assumed that a threshold A, a threshold B, and a threshold C are previously set values and assumed that the threshold B is at least greater than the threshold A. First, the selecting unit 262 determines whether the electrical power balance is less than the predetermined threshold A. Specifically, the selecting unit 262 determines whether electrical power that is equal to or greater than a predetermined level is being consumed in the subject home. If the determination result indicates that the electrical power balance is less than the predetermined threshold A, the selecting unit 262 refers to the amount of stored electrical power and then determines whether the amount of stored electrical power is less than the predetermined threshold C. Specifically, the selecting unit 262 determines whether electrical power equal to or greater than the predetermined level is stored. If the determination result indicates that the amount of stored electrical power is less than the predetermined threshold C, the selecting unit 262 determines whether the electrical power balance is less than the predetermined threshold B. Specifically, the selecting unit 262 determines, while the above described determination is being performed, whether the electrical power consumed in the subject home can be reduced to a level that can be covered by the electrical power supplied by an electric power generation facility in the subject home itself even if an amount of stored electrical power equal to or greater than the predetermined level is not ensured. It is assumed that the threshold B is greater than the threshold A.

If the determination result indicates that the electrical power balance is less than the threshold B, the selecting unit 262 proceeds to the electrical power supply destination determining process. Specifically, because the electrical power consumption in the subject home becomes large and the amount of stored electrical power is insufficient, the selecting unit 262 searches for a supply source of electrical power other than within the subject home in order to ensure a stable electrical power supply.

First, the selecting unit 262 refers to the path information 261b stored in the storing unit 261 and searches for a home whose electrical power balance is positive and that is close to the subject home. Specifically, the selecting unit 262 searches, from among homes other than the subject home, for the closest home to the subject home whose electrical power balance is positive. In the example of the path information illustrated in FIG. 6, from among the home $a_m$, the home $b_1$, and the home $k_1$ whose electrical power balances are all positive, the selecting unit 262 detects the home $k_1$, with the smallest distance (distance=1), as the home that is the closest to the subject home and whose electrical power balance is positive, i.e., as the other home.

If location information constituted from the latitude and the longitude of the other home is stored in the path information 261b in the storing unit 261 as an evaluation value related to an electrical power transmission load of the other home, the selecting unit 262 performs the following determination. Namely, the selecting unit 262 refers to the location information included in the path information 261b and selects the home whose electrical power balance is positive and that is the closest to the subject home. Furthermore, if the path information 261b in the storing unit 261 stores therein the individual differences between the voltage value at the time of electrical power transmission from each of the other homes and the voltage value at the subject home if the electrical power transmission was received from each of the other homes, the selecting unit 262 performs the following determination. Namely, the selecting unit 262 refers to the difference of the voltage values included in the path information 261b and selects a home whose electrical power balance is positive and that has the smallest difference of the voltage values.

If the determination result indicates that a home has been detected whose electrical power balance is positive and that is close to the subject home, the selecting unit 262 then refers to the path information 261b stored in the storing unit 261 and determines whether the detected home is closer to the subject home than the electrical power storage station 30. Specifically, the reason for this is that the selecting unit 262 determines whether a loss of electrical power when it is transmitted is smaller when the electrical power is transmitted from the electrical power storage station 30 rather than when it is transmitted from the neighboring home. If the determination result indicates that the detected home is closer than the electrical power storage station 30, the selecting unit 262 instructs the sending/receiving unit 263 to send, to the detected home, a request for electrical power transmission.

After instructing that a request be made for electrical power transmission, the selecting unit 262 determines whether a response has been received from the home (smart meter 200) from which the electrical power transmission is requested and that indicates that the request has been accepted. If the determination result indicates that a response has been received indicating that the request has been accepted, the selecting unit 262 instructs the switch control unit 265 to connect to the detected home such that electrical power is supplied from the detected home. In contrast, if the determination result indicates that a response has been received indicating that the request has not been accepted, the selecting unit 262 refers to the path information 261b stored in the storing unit 261 and searches again for a home from which electrical power transmission can be requested.

Furthermore, if the detected home is not closer than the electrical power storage station 30 (electrical power storage station 30 is closer), the selecting unit 262 instructs the sending/receiving unit 263 to send a request for electrical power transmission to the detected electrical power storage station 30. Then, the selecting unit 262 determines whether a response has been received from the electrical power storage station 30 from which the electrical power transmission is requested and that indicates that the request has been accepted. If the determination result indicates that a response has been received that indicates that the request has been accepted, the selecting unit 262 instructs the switch control unit 265 to connect to the electrical power storage station 30 such that electrical power transmission is received from the electrical power storage station 30. However, if the determination result indicates that a response has been received indicating that the request has not been accepted, the selecting unit 262 instructs the switch control unit 265 to connect to the electrical power plant 10 such that the electrical power supplied from the electrical power plant 10 can be used.

Furthermore, if the selecting unit 262 does not detect a home whose electrical power balance is positive and that is close to the subject home, the selecting unit 262 instructs the switch control unit 265 to connect to the electrical power plant 10 such that electrical power supplied from the electrical power plant 10 can be used.

Furthermore, if an electrical power balance greatly exceeds the threshold B, i.e., the amount of generated electrical power greatly exceeds the electrical power consumption, the selecting unit 262 instructs the switch control unit 265 to connect to the battery charger 102 such that excessive electrical power is stored in the battery 103.

Furthermore, if the selecting unit 262 receives a request for electrical power transmission from the other home, the selecting unit 262 determines whether the request for the electrical power transmission will be accepted in accordance with the state of the electrical power balance at the subject home. Then, the selecting unit 262 instructs the sending/receiving unit 263 to send, as a response to the request, the result of the determination indicating whether it is accepted. If it is determined that the request for the electrical power transmission will be accepted, the selecting unit 262 instructs the switch control unit 265 to connect to this other home such that the electrical power is supplied to this other home. Furthermore, when the selecting unit 262 instructs electrical power to be supplied, the selecting unit 262 instructs a request be made for electrical power to be supplied by the solar battery 101 that is an electrical power generating device installed in the subject home or instructs a request be made for electrical power to be supplied by the battery 103.

Furthermore, if the selecting unit 262 relays a supply and demand of electrical power between other homes or between the other home and the electrical power storage station 30, the selecting unit 262 instructs the switch control unit 265 to turn on or off a switch such that the electrical power is relayed.

Furthermore, if the selecting unit 262 relays a supply and demand of electrical power between the other homes or between the other home and the electrical power storage station 30 while receiving the supply of electrical power transmitted from the other home or the electrical power storage station 30, the selecting unit 262 instructs the switch control unit 265 to turn on or off of the corresponding switch.

A switch control pattern in accordance with the instruction from the selecting unit 262 will be described later with reference to FIGS. 9 to 13.

In accordance with the instruction from the selecting unit 262, the sending/receiving unit 263 sends requests for electrical power transmission to the other home or to the electrical power storage station 30 and receives requests for electrical power transmission sent from the other home. Furthermore, sending of requests for electrical power transmission performed by the sending/receiving unit 263 and the operation of turning on/off a switch performed by the switch control unit 265, which will be described later, are performed in cooperation with each other, whereby the sending of requests for electrical power transmission and the turning on/off of a switch are simultaneously performed.

Furthermore, the sending/receiving unit 263 sends, at a predetermined transmission period via the ad hoc communication device 220, a packet that is used to notify the other home of information related to an electrical power balance including the electrical power consumption, the amount of generated electrical power, and the amount of stored electrical power at the subject home. In contrast, if the sending/receiving unit 263 receives a packet from the other home, the sending/receiving unit 263 sends the packet to the path information creating unit 264, which will be described later, and stores the packet in the storing unit 261. A transmission period is previously set in the sending/receiving unit 263. This transmission period is uniformly distributed and is not overlapped with the time at which packets are sent by the other homes illustrated in FIG. 1. A packet is sent in this transmission period to each home located within one hop. The transmission period that is set in the sending/receiving unit 263 is preferably an interval of about one minute, which is a communication volume that is considered to not place a burden on the process performed by the smart meter 200. In this way, by exchanging a packet between homes, the smart meter 200 can be aware of, between the homes, the state of the electrical power balance at another home. Furthermore, the sending/receiving unit 263 notifies the other home of information related to an electrical power balance at the subject home by using a "Hello packet" that is used in a communication technology disclosed in, for example, Japanese Laid-open Patent Publication No. 2009-267532. The "Hellopacket" mentioned here means the packet that is used for a routing protocol of a link state type and is used to exchange path information between network nodes or check the existence of a network node.

For example, if it is predetermined transmission time described above, the sending/receiving unit 263 acquires the information stored in the packet, which has already been received from the other home, from the storing unit 261. Then, the sending/receiving unit 263 creates a packet into which information on the electrical power balance at the subject home and the relay information is inserted together with the information on the acquired packet, which has already been received, and then sends it to the other home.

FIG. 7 illustrates an example of the frame configuration of a packet that is transmitted by the sending/receiving unit 263. FIG. 7 is a schematic diagram illustrating an example configuration of a packet. As illustrated in FIG. 7, the packet frame of a packet transmitted by the sending/receiving unit 263 includes a data area that stores therein the ad hoc header in which the length of a packet or the packet type is stored, the base location name, the electrical power consumption, the amount of generated electrical power, the amount of stored electrical power, and relay information. The data $P_1$ and the data $P_2$ illustrated in FIG. 7 correspond to the information that is stored in the packet that has already been received from the other home. Furthermore, the data $P_3$ illustrated in FIG. 7, which will be described later, is information inserted into the packet that is created by the sending/receiving unit 263. The length of the packet stored in the ad hoc header is the overall length of a packet. The packet type stored in the ad hoc header indicates the type of packet, such as "Hello packet". Furthermore, the base location name stored in the data area is, for example, as illustrated in FIG. 1, the information that is uniquely attached to each home in order to identify a given home. Furthermore, the electrical power consumption, the amount of generated electrical power, and the amount of stored electrical power are meter read data on the electrical power consumption, the amount of generated electrical power, and the amount of stored electrical power in the subject home. Furthermore, the relay information is information indicating the association relationship between the transmission source and the destination of a packet.

In the following, a transmission process on a packet performed by the sending/receiving unit 263 will be described with reference to FIG. 7. If it is predetermined transmission time described above, the sending/receiving unit 263 acquires the path information 261b from the storing unit 261. For example, the sending/receiving unit 263 acquires, from the path information 261b as illustrated in FIG. 7, the electrical power consumption "0.500", the amount of generated electrical power "1.000", and the amount of stored electrical power "1,000". Then, the sending/receiving unit 263 acquires the base location name "$n_1$" that is attached to the subject home, which is the transmission source of the packet. Subsequently, the sending/receiving unit 263 creates relay information. For example, the sending/receiving unit 263 creates relay information, for example, "$n_1$-$b_1$", in which the base location name $n_1$ that is attached to the subject home corresponding to the transmission source of the packet is associated with the base location name $b_1$ that is attached to the other home that is within one hop and that corresponds to the destination of the packet. Then, the sending/receiving unit 263 stores the length of the packet and the packet type in the ad hoc header of the packet frame. Subsequently, the sending/receiving unit 263 stores, in the data area of the packet frame, the data $P_3$, which includes the base location name of the subject home, the electrical power consumption, the amount of generated electrical power, the amount of stored electrical power, and the relay information. Furthermore, the sending/receiving unit 263 sends the packet, which is created by superimposing the data $P_1$ and the data $P_2$ related to the already received packet onto the packet frame, to the other home that is the destination of the packet and that is located within one hop. As described above, because each home sequentially sends packets as illustrated in FIG. 7 to another home that is located within one hop, each home can share the information related to the electrical power balance with each other, and furthermore, each home can be aware of the location relationship (distance) it has with the other homes.

If the sending/receiving unit 263 newly receives a packet that includes the same base location name and the same relay information as that included in the already received packet, the newly received packet may be combined, or, alternatively, the packet may also be processed as follows. The sending/receiving unit 263 compares the information stored in the packets. If the result of the comparison indicates that the electrical power balance is the same, the sending/receiving unit 263 may also discard the newly received packet without processing anything. If the electrical power balances differ, the sending/receiving unit 263 updates the information that is stored in the already received packet to the information in the newly received packet.

On the basis of the packet that has been acquired from the sending/receiving unit 263, i.e., based on the information that has been acquired from the packet that is exchanged between the base locations by using ad hoc communication, the path information creating unit 264 creates the path information 261b stored in the storing unit 261 and stores it in the storing unit 261. The base location mentioned here represents the electrical power storage station 30 in addition to the homes illustrated in FIG. 1. In the following, the creation of path information performed by the path information creating unit 264 every time a packet is acquired from the sending/receiving unit 263 will be described with reference to FIG. 8. FIG. 8 is a schematic diagram illustrating an example of a method of creating the path information. For example, if the path information creating unit 264 acquires the packet that includes the data $P_1$ and the data $P_2$ illustrated in FIG. 8 from the sending/receiving unit 263, the path information creating unit 264 divides the data $P_1$ and the data $P_2$ into units that are a packet in length by using the packet length.

Then, the path information creating unit 264 refers to the relay information included in the data $P_1$ and the data $P_2$ that are divided into packets and calculates all of the routes from the base location name indicating the base location through which the packet sent from the other home is relayed until the packet reaches the subject home $n_1$. For example, based on the relay information "$b_1 \rightarrow k_1, a_1, b_m$" stored in the data $P_1$ illustrated in FIG. 7 and the relay information "$k_1 \rightarrow n_1$" stored in the data $P_2$ illustrated in FIG. 7, the path information creating unit 264 calculates the "route 1:$b_1 \rightarrow k_1 \rightarrow n_1$" and the "route 2:$k_1 \rightarrow n_1$". Then, the path information creating unit 264 acquires, from the calculated route 1, "hop count=2" as the distance between the subject home "$n_1$" and the home "$b_1$", which is the transmission source of the packet in which the data $P_1$ is stored. Then, the path information creating unit 264 calculates the balance "0.800" from the electrical power consumption and the amount of generated electrical power stored in the data $P_1$. Subsequently, the path information creating unit 264 acquires, from the data $P_1$, the base location name "$b_1$", the electrical power consumption "0.400", the amount of generated electrical power "1.200", and the amount of stored electrical power "2,000". Then, the path information creating unit 264 associates the base location name "$b_1$" with the electrical power consumption "0.400", the amount of generated electrical power "1.200", the amount of stored electrical power "2,000", the distance "2", and the balance "0.800" and then stores the data in the storing unit 261 as, for example, the path information 261b illustrated in FIG. 6. By referring to the path information 261b stored by the path information creating unit 264, the selecting unit 262 can be aware of the electrical power balance at a home that is associated with the base location name "$b_1$" or be aware of the distance between the base location name "$b_1$" and the subject home "$n_1$".

Similarly, the path information creating unit 264 acquires "hop count=1" as the distance between the subject home "$n_1$" and the home "$k_1$", which is the transmission source of the packet in which the data $P_2$ is stored. Then, the path information creating unit 264 calculates the balance "0.900" from both the electrical power consumption and the amount of generated electrical power stored in the data $P_2$. Subsequently, the path information creating unit 264 acquires, from the data $P_{er}$ the base location name "$k_1$", the electrical power consumption "0.100", the amount of generated electrical power "1.000", and the amount of stored electrical power "3,000". Then, the path information creating unit 264 associates the base location name "$k_1$" with the electrical power consumption "0.100", the amount of generated electrical power "1.000", the amount of stored electrical power "3,000", the distance "1", and the balance "0.900" and then stores the data in the storing unit 261 as, for example, the path information 261*b* illustrated in FIG. 6. By referring to the path information 261*b* stored by the path information creating unit 264, the selecting unit 262 can be aware of the electrical power balance at a home that is associated with the base location name "$k_1$" or be aware of the distance between the base location name "$k_1$" and the subject home "$n_1$".

Figure 10:
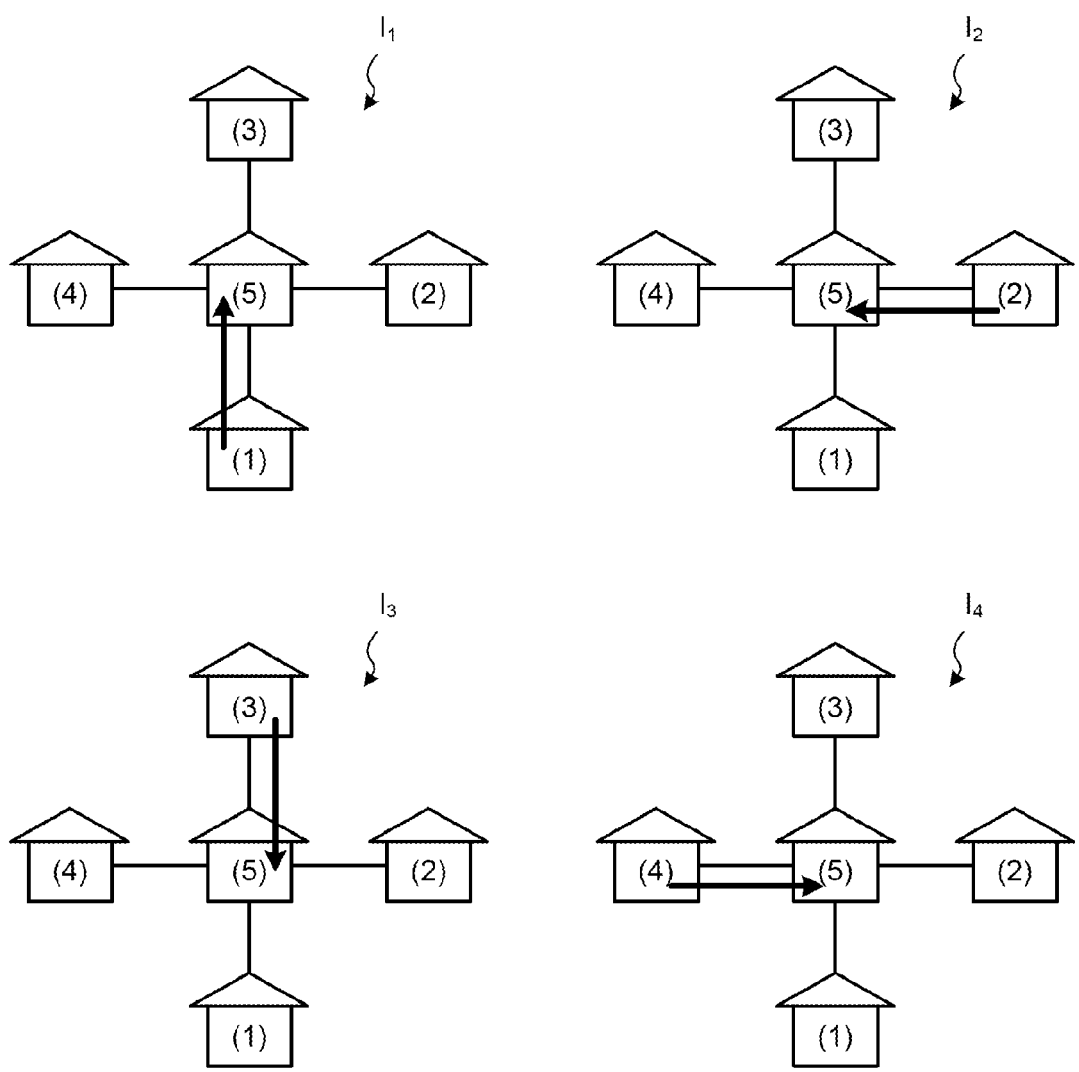
FIG. 10 is a schematic diagram illustrating a conceptual image of receiving an electrical power supply.
Figure 11:
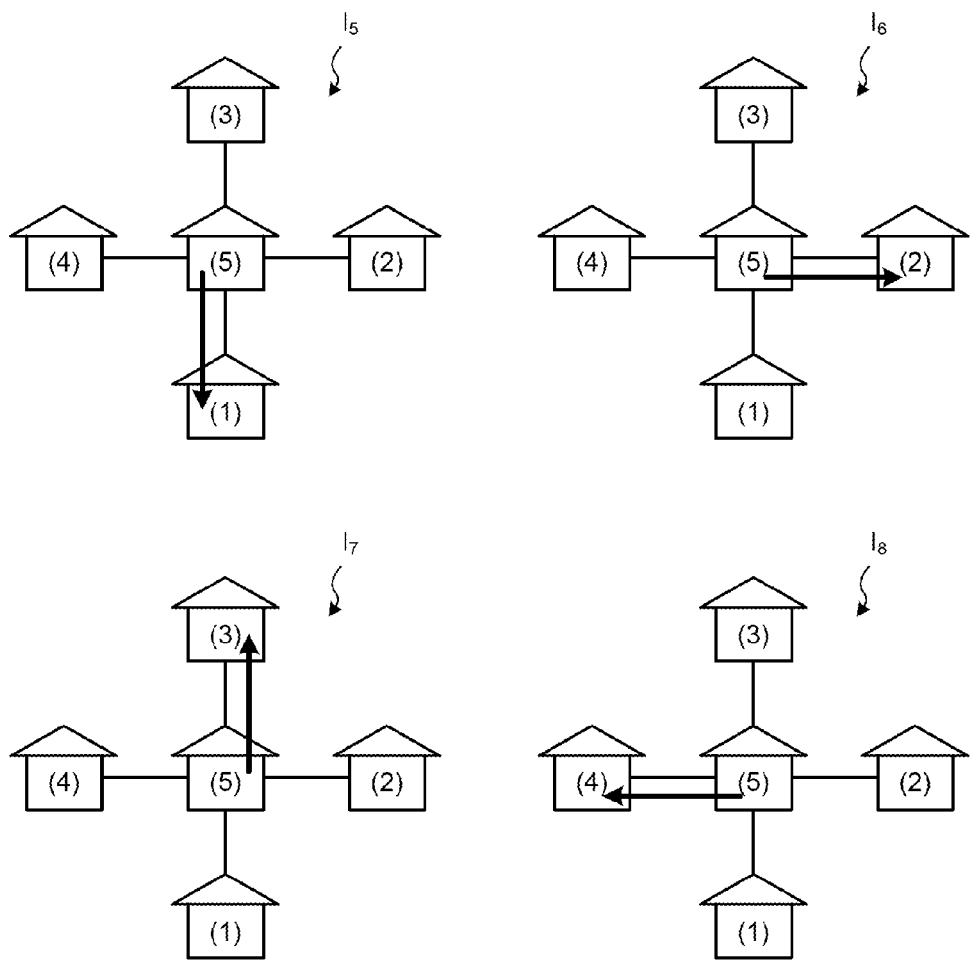
FIG. 11 is a schematic diagram illustrating a conceptual image of an electrical power supply.
Figure 12:
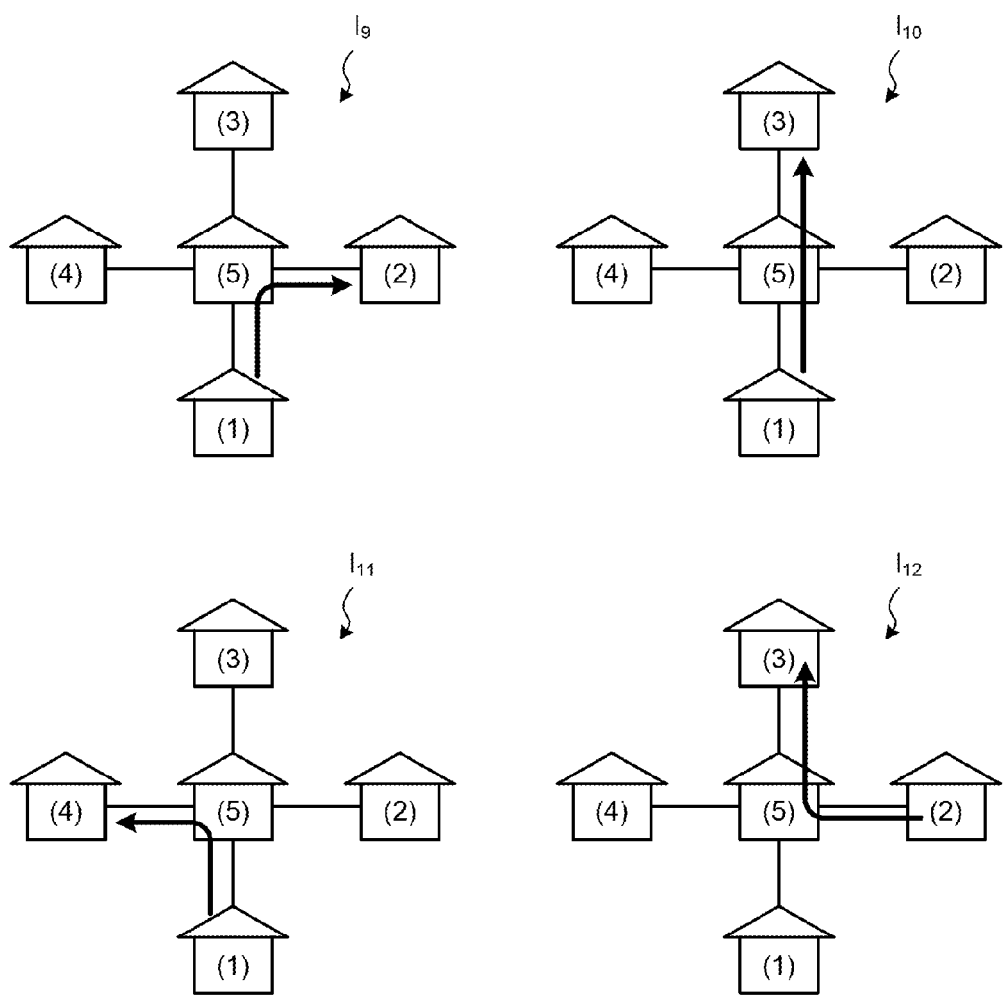
FIG. 12 is a schematic diagram illustrating a conceptual image of relaying electrical power.
Figure 13:
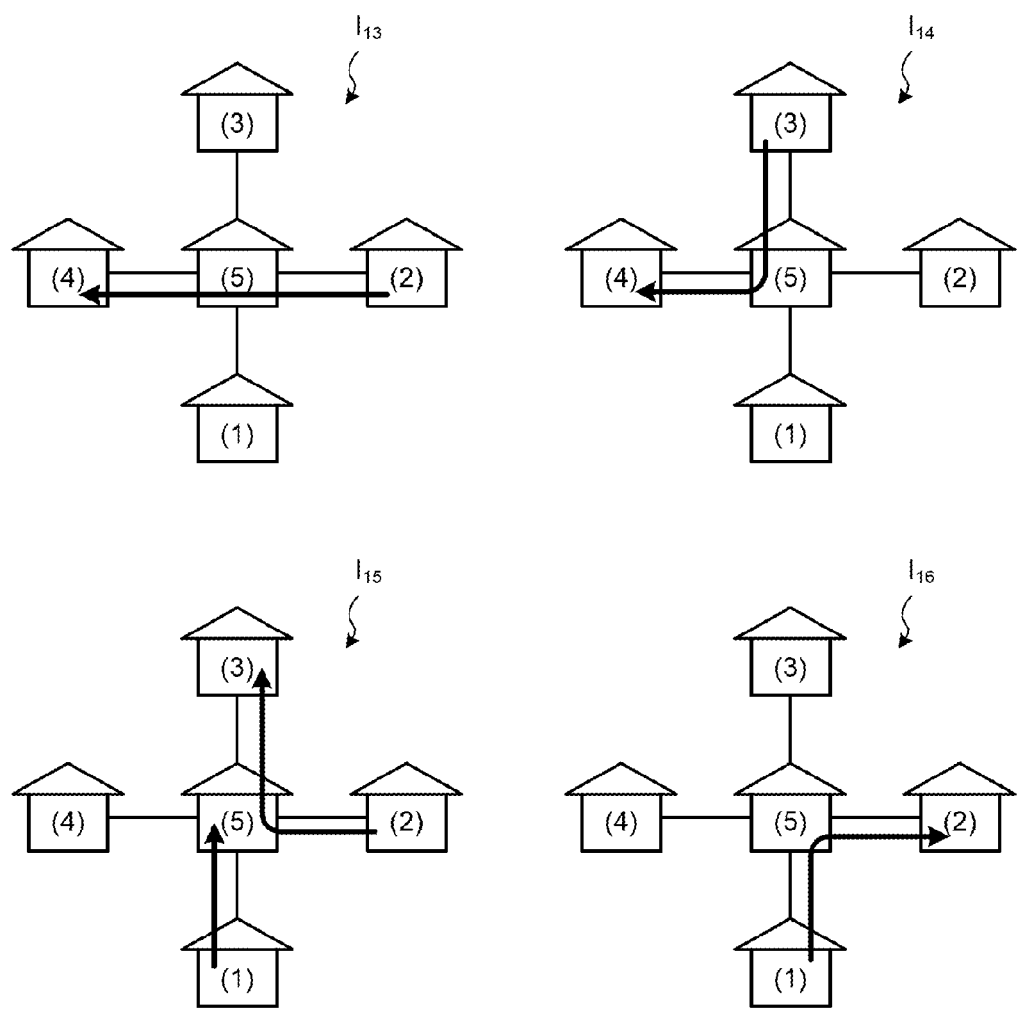
FIG. 13 is a schematic diagram illustrating a conceptual image of relaying electrical power.

The switch control unit 265 controls the on/off state of the switch such that consumption of the electrical power in the subject home is basically covered the electrical power created by the electrical power generating device in the subject home. If an instruction is received from the selecting unit 262, the switch control unit 265 controls the on/off state of the switches $S_1$ to $S_{17}$ illustrated in FIG. 3 in accordance with the instruction. In the following, controlling of the switches performed by the switch control unit 265 will be described with reference to FIGS. 3 and 9 to 13. FIG. 9 is a schematic diagram illustrating examples of on/off control patterns of switches. FIG. 10 is a schematic diagram illustrating a conceptual image of receiving an electrical power supply. FIG. 11 is a schematic diagram illustrating a conceptual image of an electrical power supply. FIGS. 12 and 13 are schematic diagrams each illustrating a conceptual image of relaying electrical power.

The switch control unit 265 controls the on/off state of the switches by using, for example, 24 patterns illustrated in FIG. 9 received from the selecting unit 262. The switch control unit 265 usually controls the on/off of state of the switch to the pattern 1, which will be described below, and controls the on/off state of the switch to the patterns 2 to 24 described below in accordance with an instruction received from the selecting unit 262. In the following, controlling of the switches by using the patterns 1 to 24 illustrated in FIG. 9 will be described. The self electrical power generating device illustrated in FIG. 9 means the electrical power generating device installed in the subject home and corresponds to, for example, the solar battery 101 illustrated in FIG. 3. Furthermore, the numeral numbers (1) to (4) in the stored electrical power transmission network 4 illustrated in FIG. 3 correspond to the other homes (1) to (4) illustrated in FIGS. 10 to 13.

For example, if the electrical power consumption in the subject home is covered by the electrical power supplied by the self electrical power generating device, the switch control unit 265 turns on the switch $S_{15}$ and turns off all of the other switches illustrated in FIG. 3 (pattern 1 illustrated in FIG. 9).

Furthermore, if the electrical power consumption in the subject home is covered by the electrical power that is stored in the battery 103 in the subject home, the switch control unit 265 turns on the switch $S_{17}$ and turns off all of the switches illustrated in FIG. 3 (pattern 2 illustrated in FIG. 9).

Furthermore, if excessive electrical power in the self electrical power generating device is stored in the battery 103, the switch control unit 265 turns on both the switch $S_{15}$ and the switch $S_{17}$ and turns off all of the switches illustrated in FIG. 3 (pattern 3 illustrated in FIG. 9).

Furthermore, if electrical power is supplied from the other home (1) or from the electrical power storage station 30 via the stored electrical power transmission network 4 illustrated in FIG. 3, the switch control unit 265 turns on the switch $S_{11}$ and turns off all of the switches illustrated in FIG. 3 (pattern 4 illustrated in FIG. 9). As illustrated in an image $I_1$ of FIG. 10, the pattern 4 is a case in which electrical power is supplied from, for example, the other home (1) to the subject home (5).

Furthermore, if electrical power is supplied from the other home (2) or from the electrical power storage station 30 via the stored electrical power transmission network 4 illustrated in FIG. 3, the switch control unit 265 turns on the switch $S_{12}$ illustrated in FIG. 3 and turns off all of the switches illustrated in FIG. 3 (pattern 5 illustrated in FIG. 9). As illustrated in an image $I_2$ of FIG. 10, the pattern 5 is a case in which electrical power is supplied from, for example, the other home (2) to the subject home (5).

Furthermore, if electrical power is supplied from the other home (3) or from the electrical power storage station 30 via the stored electrical power transmission network 4 illustrated in FIG. 3, the switch control unit 265 turns on the switch $S_{13}$ illustrated in FIG. 3 and turns off all of the switches illustrated in FIG. 3 (pattern 6 illustrated in FIG. 9). As illustrated in an image $I_3$ of FIG. 10, the pattern 6 is a case in which electrical power is supplied from, for example, the other home (3) to the subject home (5).

Furthermore, if electrical power is supplied from the other home (4) or from the electrical power storage station 30 via the stored electrical power transmission network 4 illustrated in FIG. 3, the switch control unit 265 turns on the switch $S_{14}$ illustrated in FIG. 3 and turns off all of the switches illustrated in FIG. 3 (pattern 7 illustrated in FIG. 9). As illustrated in an image $I_4$ of FIG. 10, the pattern 7 is a case in which electrical power is supplied from, for example, the other home (4) to the subject home (5).

Furthermore, if electrical power is supplied from the electrical power plant 10 via the general electrical power transmission network 5, the switch control unit 265 turns on the switch $S_{16}$ illustrated in FIG. 3 and turns off all of the switches illustrated in FIG. 3 (pattern 8 illustrated in FIG. 9).

Furthermore, if the electrical power generated from the electrical power generating device in the subject home (5) is transmitted to the other home (1) via the stored electrical power transmission network 4 illustrated in FIG. 3, the switch control unit 265 turns on the switch $S_1$ and the switch $S_{15}$ illustrated in FIG. 3 and turns off all of the switches illustrated in FIG. 3 (pattern 9 illustrated in FIG. 9). As illustrated in an image $I_5$ of FIG. 11, the pattern 9 is a case in which electrical power is supplied from, for example, the subject home (5) to the other home (1).

Furthermore, if the electrical power generated from the electrical power generating device in the subject home (5) is transmitted to the other home (2) via the stored electrical power transmission network 4 illustrated in FIG. 3, the switch control unit 265 turns on both the switch $S_2$ and the switch $S_{15}$ illustrated in FIG. 3 and turns off all of the switches illustrated in FIG. 3 (pattern 10 illustrated in FIG. 9). As illustrated in an image $I_6$ of FIG. 11, the pattern 10 is a case in which electrical power is supplied from, for example, the subject home (5) to the other home (2).

Furthermore, if the electrical power generated from the electrical power generating device in the subject home (5) is transmitted to the other home (3) via the stored electrical power transmission network 4 illustrated in FIG. 3, the switch control unit 265 turns on both the switch $S_3$ and the switch $S_{15}$ illustrated in FIG. 3 and turns off all of the switches illustrated in FIG. 3 (pattern 11 illustrated in FIG. 9). As illustrated in an image $I_7$ of FIG. 11, the pattern 11 is a case in which electrical power is supplied from, for example, the subject home (5) to the other home (3).

Furthermore, if the electrical power generated from the electrical power generating device in the subject home (5) is transmitted to the other home (4) via the stored electrical power transmission network 4 illustrated in FIG. 3, the switch control unit 265 turns on both the switch $S_4$ and the switch $S_{15}$ illustrated in FIG. 3 and turns off all of the switches illustrated in FIG. 3 (pattern 12 illustrated in FIG. 9). As illustrated in an image $I_8$ of FIG. 11, the pattern 12 is a case in which electrical power is supplied from, for example, the subject home (5) to the other home (4).

Furthermore, if the electrical power in the battery 103 in the subject home (5) is transmitted to the other home (1) via the stored electrical power transmission network 4 illustrated in FIG. 3, the switch control unit 265 turns on both the switch $S_{11}$ and the switch $S_{17}$ illustrated in FIG. 3 and turns off all of the switches illustrated in FIG. 3 (pattern 13 illustrated in FIG. 9). The flow of the electrical power supplied by using the pattern 13 is the same as that illustrated in, for example, the image $I_5$ of FIG. 11.

Furthermore, if the electrical power in the battery 103 in the subject home (5) is transmitted to the other home (2) via the stored electrical power transmission network 4 illustrated in FIG. 3, the switch control unit 265 turns on the switch $S_{12}$ and the switch $S_{17}$ illustrated in FIG. 3 and turns off all of the switches illustrated in FIG. 3 (pattern 14 illustrated in FIG. 9). The flow of the electrical power supplied by using the pattern 14 is the same as that illustrated in, for example, the image $I_6$ of FIG. 11.

Furthermore, if the electrical power in the battery 103 in the subject home (5) is transmitted to the other home (3) via the stored electrical power transmission network 4 illustrated in FIG. 3, the switch control unit 265 turns on the switch $S_{13}$ and the switch $S_{17}$ illustrated in FIG. 3 and turns off all of the switches illustrated in FIG. 3 (pattern 15 illustrated in FIG. 9). The flow of the electrical power supplied by using the pattern 15 is the same as that illustrated in, for example, the image $I_7$ of FIG. 11.

Furthermore, if the electrical power in the battery 103 in the subject home (5) is transmitted to the other home (4) via the stored electrical power transmission network 4 illustrated in FIG. 3, the switch control unit 265 turns on both the switch $S_{14}$ and the switch $S_{17}$ illustrated in FIG. 3 and turns off all of the switches illustrated in FIG. 3 (pattern 16 illustrated in FIG. 9). The flow of the electrical power supplied by using the pattern 16 is the same as that illustrated in, for example, the image $I_8$ of FIG. 11.

Furthermore, if the electrical power transmitted from the other home (1) is relayed to the other home (2) via the stored electrical power transmission network 4 illustrated in FIG. 3, the switch control unit 265 turns on the switch $S_5$ illustrated in FIG. 3 and turns off all of the switches illustrated in FIG. 3 (pattern 17 illustrated in FIG. 9). As illustrated in an image $I_9$ of FIG. 12, the pattern 17 is a case in which the electrical power supplied from the other home (1) to the other home (2) is relayed by the subject home (5).

Furthermore, if the electrical power transmitted from the home (1) is relayed to the other home (3) via the stored electrical power transmission network 4 illustrated in FIG. 3, the switch control unit 265 turns on the switch $S_6$ illustrated in FIG. 3 and turns off all of the switches illustrated in FIG. 3 (pattern 18 illustrated in FIG. 9). As illustrated in an image $I_{10}$ of FIG. 12, the pattern 18 is a case in which the electrical power supplied from the other home (1) to the other home (3) is relayed by the subject home (5).

Furthermore, if the electrical power transmitted from the home (1) is relayed to the other home (4) via the stored electrical power transmission network 4 illustrated in FIG. 3, the switch control unit 265 turns on the switch $S_7$ illustrated in FIG. 3 and turns off all of the switches illustrated in FIG. 3 (pattern 19 illustrated in FIG. 9). As illustrated in an image $I_n$ of FIG. 12, the pattern 18 is a case in which the electrical power supplied from the other home (1) to the other home (4) is relayed by the subject home (5).

Furthermore, if the electrical power transmitted from the home (2) is relayed to the other home (3) via the stored electrical power transmission network 4 illustrated in FIG. 3, the switch control unit 265 turns on the switch $S_8$ illustrated in FIG. 3 and turns off all of the switches illustrated in FIG. 3 (pattern 20 illustrated in FIG. 9). As illustrated in an image $I_{12}$ of FIG. 12, the pattern 18 is a case in which the electrical power supplied from the other home (2) to the other home (3) is relayed by the subject home (5).

Furthermore, if the electrical power transmitted from the home (2) is relayed to the other home (4) via the stored electrical power transmission network 4 illustrated in FIG. 3, the switch control unit 265 turns on the switch $S_9$ illustrated in FIG. 3 and turns off all of the switches illustrated in FIG. 3 (pattern 21 illustrated in FIG. 9). As illustrated in an image $I_{13}$ of FIG. 13, the pattern 21 is a case in which the electrical power supplied from the other home (2) to the other home (4) is relayed by the subject home (5).

Furthermore, if the electrical power transmitted from the home (3) is relayed to the other home (4) via the stored electrical power transmission network 4 illustrated in FIG. 3, the switch control unit 265 turns on the switch $S_{10}$ illustrated in FIG. 3 and turns off all of the switches illustrated in FIG. 3 (pattern 22 illustrated in FIG. 9). As illustrated in an image $I_{14}$ of FIG. 13, the pattern 22 is a case in which the electrical power supplied from the other home (3) to the other home (4) is relayed by the subject home (5).

Furthermore, if the electrical power transmitted from the other home (2) is relayed to the other home (3) via the stored electrical power transmission network 4 illustrated in FIG. 3 while electrical power transmitted from the other home (1) or the electrical power storage station 30 is being received, the switch control unit 265 controls the on/off state of the switches as follows. Namely, the switch control unit 265 turns on both the switch $S_8$ and the switch $S_{11}$ illustrated in FIG. 3 and turns off all of the switches illustrated in FIG. 3 (pattern 23 illustrated in FIG. 9). The image $I_{15}$ illustrated in FIG. 13 is a case of, for example, using the pattern 23. Specifically, the electrical power supplied from the other home (2) to the other home (3) is relayed by the subject home (5) while the subject home (5) is receiving a supply of electrical power from the other home (1).

Furthermore, if electrical power transmitted from the other home (1) to the other home (2) is relayed via the stored electrical power transmission network 4 while the electrical power consumed in the subject home is being covered by the electrical power generated by the electrical power generating device in the subject home, the switch control unit 265 controls the on/off state of the switches as follows. Namely, the switch control unit 265 turns on both the switch $S_5$ and the switch $S_{15}$ illustrated in FIG. 3 and turns off all of the other switches (pattern 24 illustrated in FIG. 9). The flow of the electrical power that is used and relayed by using the pattern 24 is, for example, the image $I_{16}$ illustrated in FIG. 13. The electrical power consumed in the subject home (5) is covered by the subject home (5) itself, and furthermore, the electrical power supplied from the other home (1) to the other home (2) is relayed by the subject home (5).

The patterns of the switch control performed by the switch control unit 265 described above are only examples and may also be appropriately changed in accordance with the configuration of the electrical power system or the relationship with the supply source and destination of the electrical power.

Figure 14:
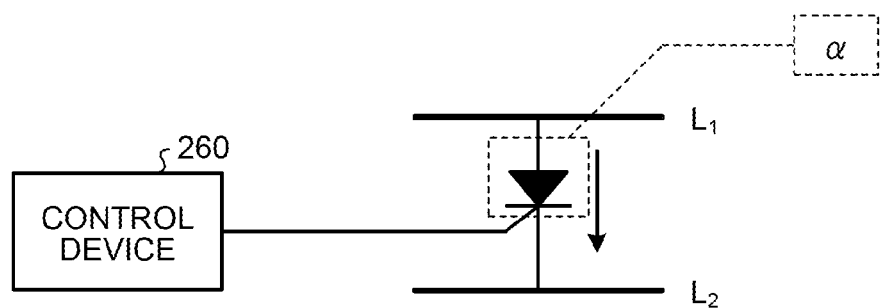
FIG. 14 is a schematic diagram illustrating an example configuration of a switch.
Figure 15:
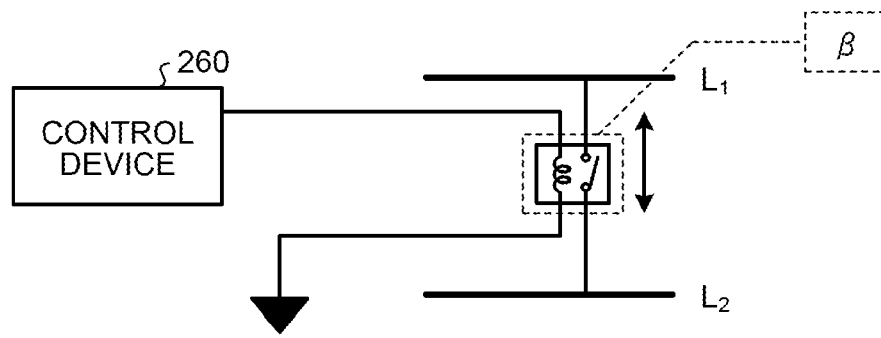
FIG. 15 is a schematic diagram illustrating an example configuration of a switch.

FIGS. 14 and 15 each illustrates an example configuration of a switch controlled by the switch control unit 265. FIGS. 14 and 15 schematic diagrams each illustrating an example configuration of a switch. A thyristor α, which is a semiconductor element, is installed in the switch illustrated in FIG. 14. With the switch having the configuration illustrated in FIG. 14, by turning on an input/output of the switch control unit 265, the thyristor α is turned on, whereby a current flows from a line $L_1$ to a line $L_2$. If it is desired to flow a current from the line $L_2$ to the line $L_1$, the thyristor α is installed in an inverse direction. A relay circuit β installed in the switch illustrated in FIG. 15. With the switch having the configuration illustrated in FIG. 15, by turning on an input/output of the switch control unit 265, the relay circuit β is turned on, whereby the line $L_1$ and the line $L_2$ are connected and thus a current flows.

The selecting unit 262, the sending/receiving unit 263, the path information creating unit 264, and the switch control unit 265 described above are, for example, implemented by an electronic circuit or an integrated circuit. An example of the electronic circuit includes a central processing unit (CPU) or a micro processing unit (MPU). An example of the integrated circuit includes an application specific integrated circuit (ASIC) or a field programmable gate array (FPGA).

Process Performed by the Smart Meter 200 in the First Embodiment

Figure 16:
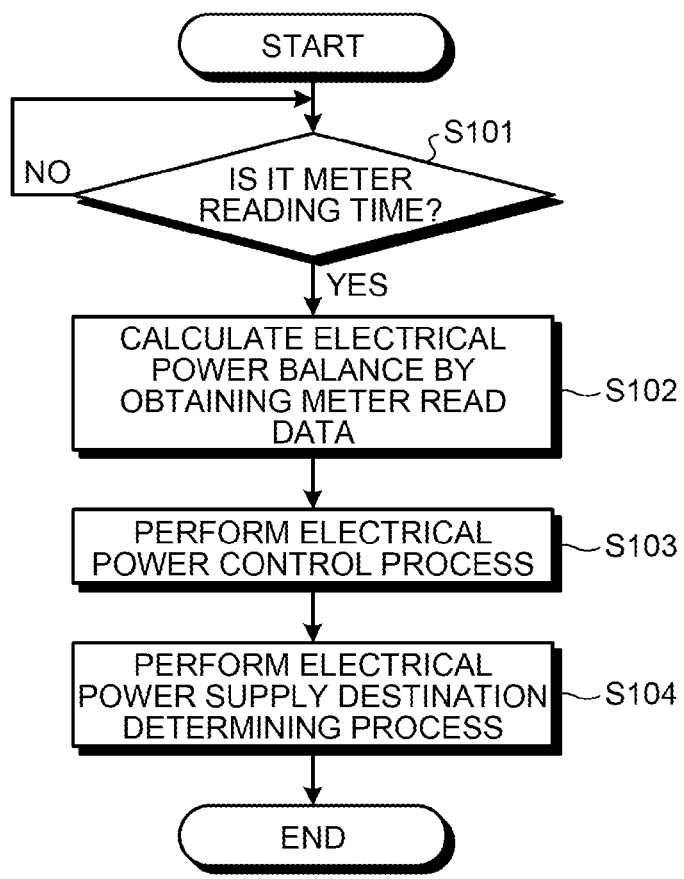
FIG. 16 is a flowchart illustrating the flow of a process according to the first embodiment.
Figure 17:
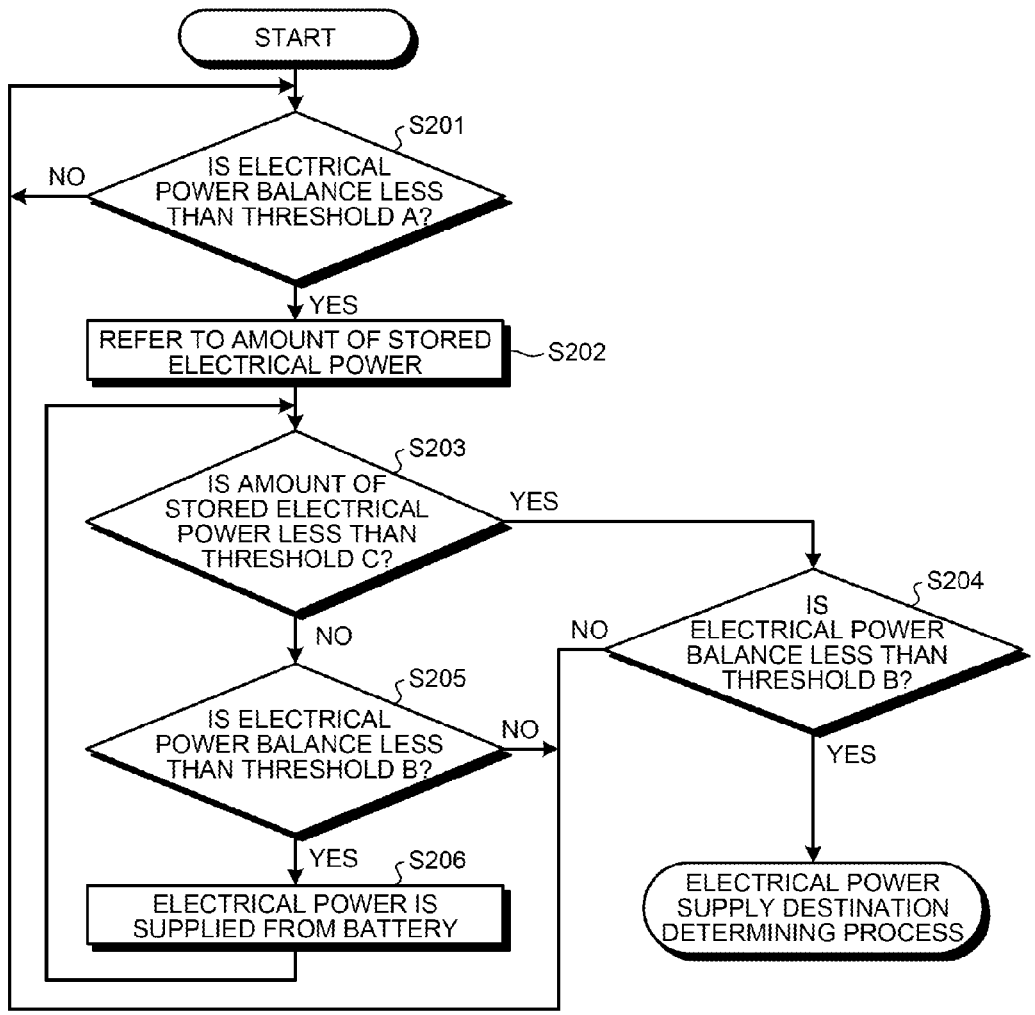
FIG. 17 is a flowchart illustrating the flow of an electrical power control process.
Figure 18:
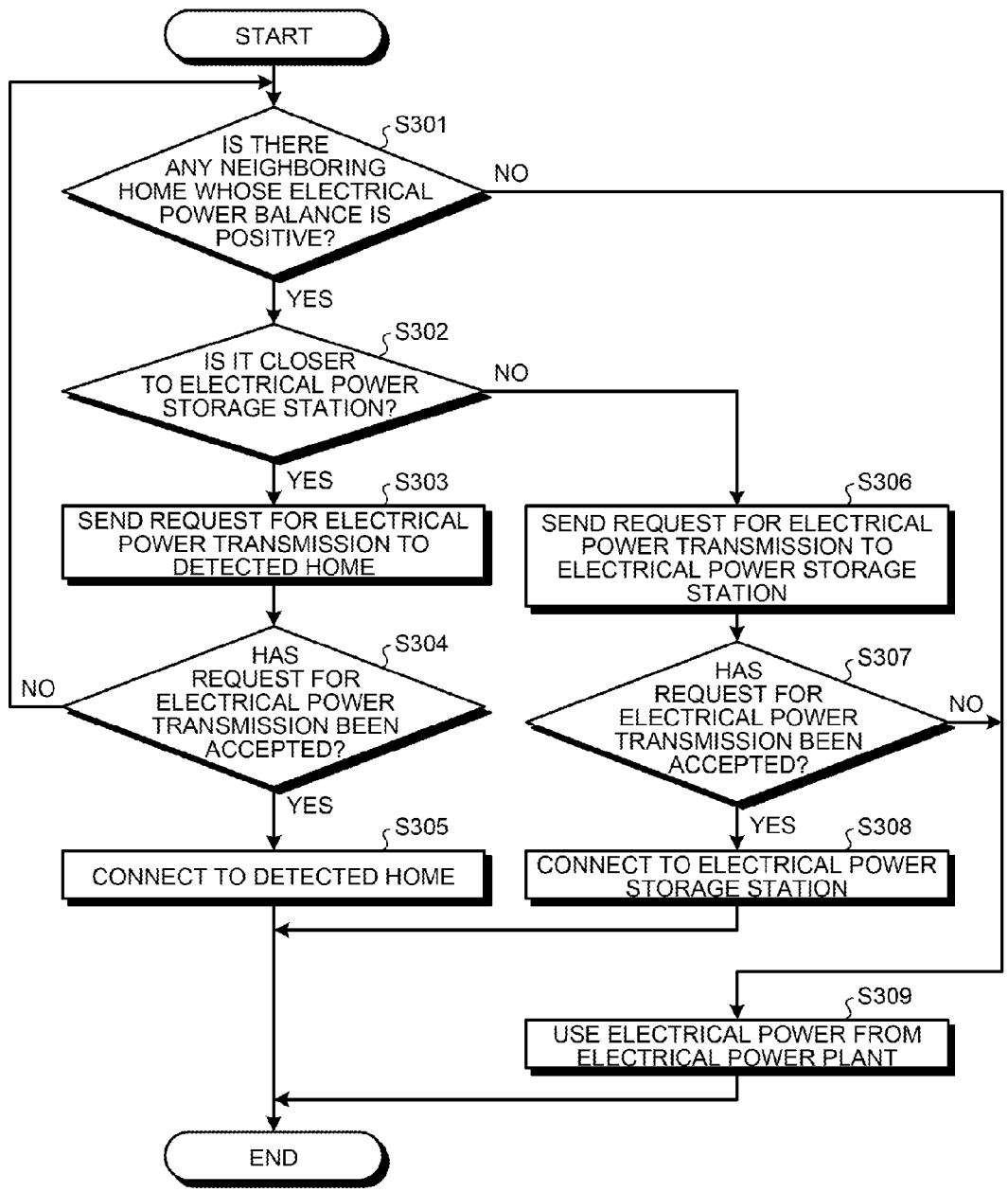
FIG. 18 is a flowchart illustrating the flow of an electrical power supply destination determining process.

In the following, the flow of a process performed by the smart meter 200 will be described with reference to FIGS. 16 to 18. FIG. 16 is a flowchart illustrating the flow of a process according to the first embodiment. FIG. 17 is a flowchart illustrating the flow of an electrical power control process. FIG. 18 is a flowchart illustrating the flow of an electrical power supply destination determining process. The processes illustrated in FIGS. 16 to 18, which will be described below, are performed by a smart meter installed in each of the homes.

Flow of the Overall Process

First, the flow of the overall process performed by the smart meter 200 will be described with reference to FIG. 16. As illustrated in FIG. 16, the selecting unit 262 determines whether it is meter reading time of the electrical power consumption, the amount of generated electrical power, and the amount of stored electrical power at the subject home (Step S101). If it is not meter reading time (No at Step S101), the selecting unit 262 repeatedly performs the determination performed at Step S101. In contrast, if it is meter reading time (Yes at Step S101), the selecting unit 262 acquires the meter read data related to the electrical power consumption, the amount of generated electrical power, and the amount of stored electrical power measured by the measuring instrument 250 and then calculates an electrical power balance obtained by subtracting the electrical power consumption from the amount of generated electrical power (Step S102). Then, the selecting unit 262 performs the electrical power control process (Step S103). Then, the selecting unit 262 performs the electrical power supply destination determining process (Step S104) and ends the process.

Electrical Power Control Process

In the following, the flow of the electrical power control process will be described with reference to FIG. 17. The process illustrated in FIG. 17 is repeatedly performed when the smart meter 200 is running on. The selecting unit 262 determines whether the electrical power balance is less than the predetermined threshold A (Step S201). Specifically, the reason for this is that the selecting unit 262 determines whether electrical power that is equal to or greater than a predetermined level is being consumed in the subject home. The determination performed at Step S201 is repeatedly performed until the electrical power balance becomes less than the predetermined threshold A. If the determination result indicates that the electrical power balance is less than the predetermined threshold A (Yes at Step S201), the selecting unit 262 refers to the amount of stored electrical power (Step S202) and determines whether the amount of stored electrical power is less than the predetermined threshold C (Step S203). Specifically, the reason for this is that the selecting unit 262 determines whether the amount of stored electrical power equal to or greater than the predetermined level is ensured.

If the determination result indicates that, the amount of stored electrical power is less than the predetermined threshold C (Yes at Step S203), the selecting unit 262 determines whether the electrical power balance is less than the predetermined threshold B (Step S204). Specifically, the reason for this is that the selecting unit 262 determines whether, while the above described determination is being performed, whether the electrical power consumed in the subject home can be reduced to a level that can be covered by the electrical power supplied by an electric power generation facility in the subject home itself even if an amount of stored electrical power equal to or greater than the predetermined level is not ensured. The threshold B is set to be greater than the threshold A described above.

If the determination result indicates that the electrical power balance is less than the threshold B (Yes at Step S204), the selecting unit 262 proceeds to the electrical power supply destination determining process illustrated in FIG. 18, which will be described later.

At Step S204 described above, if the lectrical power balance is equal to or greater than the threshold B (No at Step S204), the selecting unit 262 returns to Step S201. At Step S203, if the amount of stored electrical power is equal to or greater than the predetermined threshold C (No at Step S203), the selecting unit 262 determines whether the electrical power balance is less than the predetermined threshold B (Step S205). Specifically, the reason for this is that, similarly to the determination performed at Step S204, the selecting unit 262 determines, while the above described processes at Steps S201 to S204 are being performed, whether the electrical power consumed in the subject home can be reduced to a level that can be covered by the electrical power supplied by an electric power generation facility in the subject home itself.

If the determination result indicates that the electrical power balance is less than the threshold B (Yes at Step S205), the selecting unit 262 instructs the switch control unit 265 to connect to the battery charger 102 such that electrical power is supplied to the subject home by using the electrical power stored in the battery 103 (Step S206). Then, the selecting unit 262 returns to the determination performed at Step S203 described above. Specifically, the reason for this is that the electrical power remained in the battery 103 is monitored. In contrast, if the determination result indicates that, if the electrical power balance is equal to or greater than the threshold B (No at Step S205), the selecting unit 262 returns to Step S201. Specifically, the reason for this is that the process returns to monitor an electrical power balance under the assumption that the electrical power consumed in the subject home has been reduced to a level that can be covered by the electrical power supplied by an electric power generation facility in the subject home itself.

Electrical Power Supply Destination Determining Process

In the following, the flow of the electrical power supply destination determining process will be described with reference to FIG. 18. A process moves to the electrical power supply destination determining process if the result of the determination of the electrical power control process illustrated in FIG. 17 at Step S204 is positive. Specifically, the process illustrated in FIG. 18 is performed to search the homes other than the subject home for the supply destination of electrical power if the electrical power consumption at the subject home is large and the amount of stored electrical power is the smallest.

As illustrated in FIG. 18, the selecting unit 262 refers to the path information 261*b* stored in the storing unit 261 and searches for a home whose electrical power balance is positive and that is close to the subject home (Step S301). Specifically, the reason for this is that, by searching from among homes other than the subject home, for the closest home to the subject home whose electrical power balance is positive, the selecting unit 262 detects a home that has sufficient electrical power and has the smallest loss of electrical power transmission. In the example of the path information illustrated in FIG. 6, the selecting unit 262 from among the home $a_m$, the home $b_1$, and the home $k_1$ whose electrical power balances are all positive, the selecting unit 262 detects the home $k_1$, with the smallest distance (distance=1), as the home that is the closest to the subject home and whose electrical power balance is positive, i.e., as the other home.

If the selecting unit 262 detects a home whose electrical power balance is positive and that is close to the subject home (Yes at Step S301), the selecting unit 262 determines whether the detected home is closer to the subject home than the electrical power storage station 30 (Step S302). Specifically, the reason for this is that the selecting unit 262 determines whether a loss of electrical power when it is transmitted is smaller when the electrical power is transmitted from the electrical power storage station 30 rather than when it is transmitted from the neighboring home.

If the determination result indicates that that the detected home is closer than the electrical power storage station 30 (Yes at Step S302), the selecting unit 262 instructs the sending/receiving unit 263 to send, to the detected home, a request for electrical power transmission (Step S303).

Subsequently, the selecting unit 262 determines whether a response has been received from the home from which the electrical power transmission is requested and that indicates that the request has been accepted (Step S304). If the determination result indicates that a response has been received indicating that the request has been accepted (Yes at Step S304), the selecting unit 262 instructs the switch control unit 265 to connect to the detected home such that electrical power is supplied from the detected home (Step S305) and then ends the process. In contrast, if the determination result indicates that a response has been received indicating that the request has not been accepted (No at Step S304), the selecting unit 262 returns to Step S301 in which the determination process is performed.

At Step S302, if the detected home is not closer (distant) than the electrical power storage station 30 (No at Step S302), the selecting unit 262 instructs the sending/receiving unit 263 to send a request for electrical power transmission to the detected electrical power storage station 30 (Step S306). Then, the selecting unit 262 determines whether a response has been received from the electrical power storage station 30 and that indicates that the request has been accepted (Step S307). If the determination result indicates that a response has been received indicating that the request has been accepted (Yes at Step S307), the selecting unit 262 instructs the switch control unit 265 to connect to the electrical power storage station 30 such that electrical power is supplied from the electrical power storage station 30 (Step S308) and then ends the process. In contrast, if the determination result indicates that a response has been received indicating that the request has not been accepted (No at Step S307), the selecting unit 262 instructs the switch control unit 265 to connect to the electrical power plant 10 such that the electrical power supplied from the electrical power plant 10 can be used (Step S309) and then ends the process.

At Step S301 described above, if the selecting unit 262 does not detect a home whose electrical power balance is positive and that is close to the subject home (No at Step S301), the selecting unit 262 moves to the process performed at Step S309, determines that the electrical power supplied from the electrical power plant 10 will be used, and then ends the process.

Figure 19:
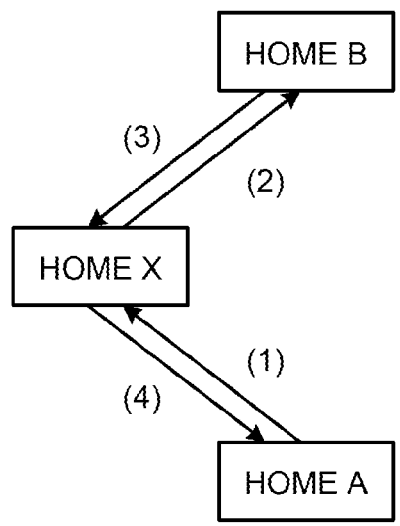
FIG. 19 is a schematic diagram illustrating an example of the connection order of an electrical power supply route.

In the following, a description will be given of an example of the connection order of an electrical power supply route from the electrical power transmission source to the destination. This process is performed if, for example, a response has been received that indicates that the request has been accepted at Step S304 described above. FIG. 19 is a schematic diagram illustrating an example of the connection order of an electrical power supply route.

Delivery Guarantee Type

First, the connection order used in the delivery guarantee type will be described with reference to FIG. 19. A home A sends a request for electrical power transmission toward a home B ((1) in FIG. 19). A home X that received, from the home A, the request for electrical power transmission to the home B transfers, to the home B, the request for electrical power transmission ((2) in FIG. 19). The home B that has received the request for electrical power transmission via the home X from the home A, which is the transmission source, the following process is performed. Namely, if the home B can supply electrical power, the home B switches the connection configuration such that the electrical power is supplied to the home A and then sends, to the home A, a response indicating that the request has been accepted. If the home B is not able to supply electrical power, the home B sends, to the home A, a response indicating that the request has been rejected ((3) in FIG. 19). If the response indicates that the request has been accepted, the home X that receives, from the home B, a response that is to be sent to the home A switches the connection configuration to the connection configuration, as the pattern 17 to pattern 22 illustrated in FIG. 9, such that electrical power is relayed and then transfers the response received from the home B to the home A ((4) in FIG. 19). In contrast, if the response indicates that request has been rejected, the home X transfers the response received from the home B to the home A without changing the connection configuration of the switch ((4) in FIG. 19). The home A that has received, from the home X, the response from the home B switches the connection configuration such that electrical power is supplied if the response indicates that the request has been received. In contrast, if the response indicates that the request has been rejected, the home A searches for another home. The same process is performed, if the connection is made to the electrical power storage station 30.

Processing Time Priority Type

In the following, the connection order used in the processing time priority type will be described with reference to FIG. 19. At the same time the home A sends the request for electrical power transmission to the home B ((1) in FIG. 19), the home A switches the connection configuration such that electrical power is supplied. The home X, which has received the request for electrical power transmission to the home B from the home A, switches the connection configuration such that electrical power is relayed and then transfers, to the home B, the request for electrical power transmission ((2) in FIG. 19). If the home B, which has received the request for electrical power transmission via the home X from the home A that corresponds to the transmission source, can supply the electrical power, the home B switches the connection configuration such that the electrical power is supplied and then ends the process. In contrast, if the home B is not able to supply electrical power, the home B sends, to the home A, a response indicating that the request has been rejected ((3) in FIG. 19). The home X that has received, from the home B, a response to be sent to the home A restores the connection configuration of the switch and then transfers, to the home A, the response from the home B received via the home X ((4) in FIG. 19). The home A that has received, from the home X, the response from the home B restores the connection configuration of the switch and then searches for another home. The same process is performed, if the connection is made to the electrical power storage station 30.

Advantage of the First Embodiment

As described above, if an electrical power balance at the subject home is less than the predetermined threshold, the smart meter 200 selects another home as the destination of an electrical power transmission request. This selection is made based on both an evaluation value related to the electrical power transmission load of the other home stored in the storing unit 261 and the electrical power balance at the other home. Then, the smart meter 200 sends, to the selected other home, the request for electrical power transmission. The smart meter 200 promptly switches electrical power transmission network in an autonomous distributed manner by cooperating with the switches without using a central control unit, such as a server. In this way, the smart meter 200 can simultaneously perform both the request for electrical power transmission and the switching (controlling the on/off state of switches). Consequently, according to the first embodiment, a prompt electrical power supply is possible by immediately responding to the sufficiency/insufficiency of electrical power, and furthermore, it is possible to reduce an electrical power loss when electrical power is transmitted.

Furthermore, if an electrical power balance at the subject home is less then the predetermined threshold, the smart meter 200 refers to the distances (hop counts) and electrical power balances at the other homes stored as the evaluation values in the path information 261*b* and then selects the other home whose electrical power balance is positive and that is the closest to the subject home. Then, the smart meter 200 sends, to the selected home, a request for electrical power transmission. Consequently, according to the first embodiment, by using hop counts that can be acquired based on the packets exchanged between the smart meter 200 installed in each of the homes, the evaluation values related to the electrical power load between a subject home and another home; therefore, it is possible to easily select the other home whose evaluation value is the largest (the shortest distance). Consequently, according to the first embodiment, it is possible to reduce an electrical power loss when electrical power is transmitted.

Furthermore, if an electrical power balance is positive and the electrical power storage station 30 is closer to the subject home than the other home that is the closest to the subject home, the smart meter 200 sends a request for electrical power transmission to the electrical power storage station 30. Consequently, the smart meter 200 can avoid electrical power transmission from the other home, which is inefficient compared with the electrical power transmission from the electrical power storage station 30; therefore, it is possible to reduce an electrical power loss to a maximum when electrical power is transmitted.

Furthermore, if the received request for the electrical power transmission is not to be sent to the subject home, the smart meter 200 transfers the request to the destination. Therefore, even if the distance between the request source and the request destination of the electrical power transmission is large, the request for electrical power transmission is ensured. Consequently, if an electrical power loss is reduced when the electrical power is transmitted, the electrical power can be smoothly supplied and demanded in the same area connected to the same communication network 3, the stored electrical power transmission network 4, the general electrical power transmission network 5, and the like.

With the related technology that controls an electrical power supply and demand, in order to obtain information conforming to a change in an electrical power balance that continuously varies in each home, information needs to be exchanged between smart meters at time intervals of, for example, one minute or 100 seconds. However, with the communication technology that exchanges information at short time intervals, because messages related to, for example, electrical power balances broadcast from each smart meter, a load placed on a network becomes large in accordance with the number of smart meters. In contrast, with the communication technology in which a load applied to a network is small, because information is not exchanged at short time intervals, it is not possible to obtain information conforming to a change in an electrical power balance that continuously varies in each home. As described above, with the related technology that controls an electrical power supply and demand, it is not possible to exchange appropriate information related to an electrical power balance in each home. Consequently, there is a problem in that, with the related technology that controls an electrical power supply and demand, an electrical power supply and demand is not always appropriately controlled. However, the smart meter 200 sends a packet that includes information related to an electrical power balance including the electrical power consumption, the amount of generated electrical power, and the amount of stored electrical power at the subject home at predetermined transmission intervals, which are uniformly distributed and are not overlapped with the time at which packets are sent by the other homes. Consequently, the smart meter 200 can be aware of the state of an electrical power balance conforming to a change in an electrical power balance at each home without placing a burden on a network, and furthermore, can appropriately perform a process for reducing a loss of electrical power when the electrical power is transmitted.

By exchanging packets including information related to electrical power balances, it is possible to be aware of the state of an electrical power balance conforming to a change in an electrical power balance in each home. Consequently, it is possible to reduce electrical power as much as possible that is needed to manage the information related to the electrical power balance.

Furthermore, because electrical power is supplied from the electrical power storage station 30, even if electrical power is not supplied from the electrical power plant 10, it is possible to avoid a massive power failure or the like.

In the first embodiment, a description has been given of a case in which an electrical power balance in a home is monitored and a request for electrical power transmission at another home is sent in accordance with the electrical power balance in the home. However, for example, it is conceivable to use a technology, as an embodiment, that arranges a device corresponding to the smart meter 200 according to the first embodiment in each area including multiple homes, that monitors an electrical power balances in the area, and that sends a request for electrical power transmission to another area in accordance with the electrical power balance in the area.

Furthermore, in the first embodiment, an amount of stored electrical power in the electrical power storage station 30 is not considered when electrical power is supplied from the electrical power storage station 30. However, if the amount of stored electrical power at the electrical power storage station 30 does not meet a predetermined level, electrical power does not have to be supplied from the electrical power storage station 30.

[b] Second Embodiment

The method, which has been described in the first embodiment, of performing the electrical power supply and demand between homes may also be used between electrical power storage stations. Accordingly, another embodiment included in the present invention will be described as a second embodiment below. In the second embodiment, the electrical power supply and demand is performed with an electrical power storage station other than the electrical power storage station 30 in accordance with the available supply amount of electrical power at the electrical power storage station. In a second embodiment, a description will be given of a case in which an electrical power storage station supplies electrical power to each home that is managed by and connected to the electrical power storage station, monitors an amount of stored electrical power, and performs the electrical power supply and demand with the other electrical power storage station in accordance with the amount of stored electrical power.

Figure 20:
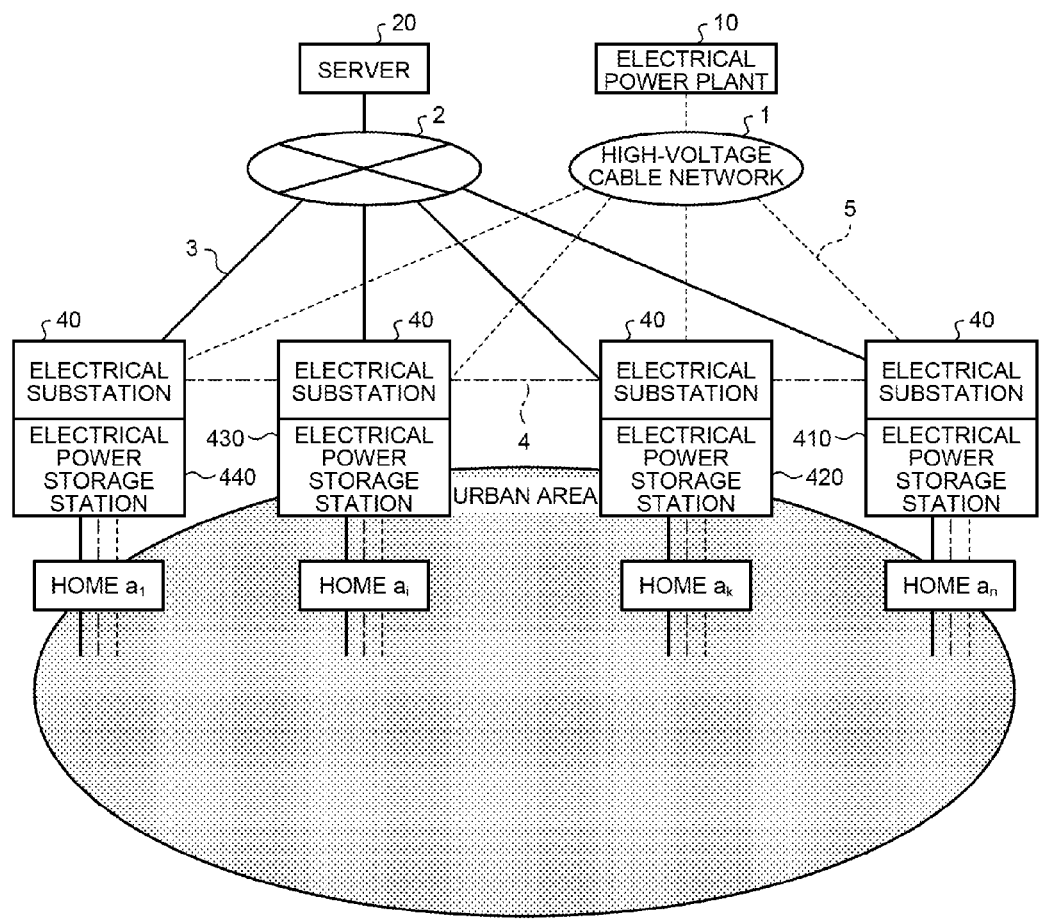
FIG. 20 is a schematic diagram illustrating the overall configuration according to a second embodiment.

FIG. 20 is a schematic diagram illustrating the overall configuration according to a second embodiment. As illustrated in FIG. 20, in the second embodiment, the overall configuration is basically the same as the first embodiment; however, the second embodiment differs from the first embodiment in that multiple electrical power storage stations are included. As illustrated in FIG. 20, the electrical power storage stations are connected with each other via the stored electrical power transmission network 4. In FIG. 20, for convenience of description, four electrical power storage stations, i.e., electrical power storage stations 410 to 440 are illustrated; however, the number of the electrical power storage stations is not limited thereto. In the following, the electrical power storage station 410 will be described.

Configuration of an Electrical Power Storage Station in the Second Embodiment

Figure 21:
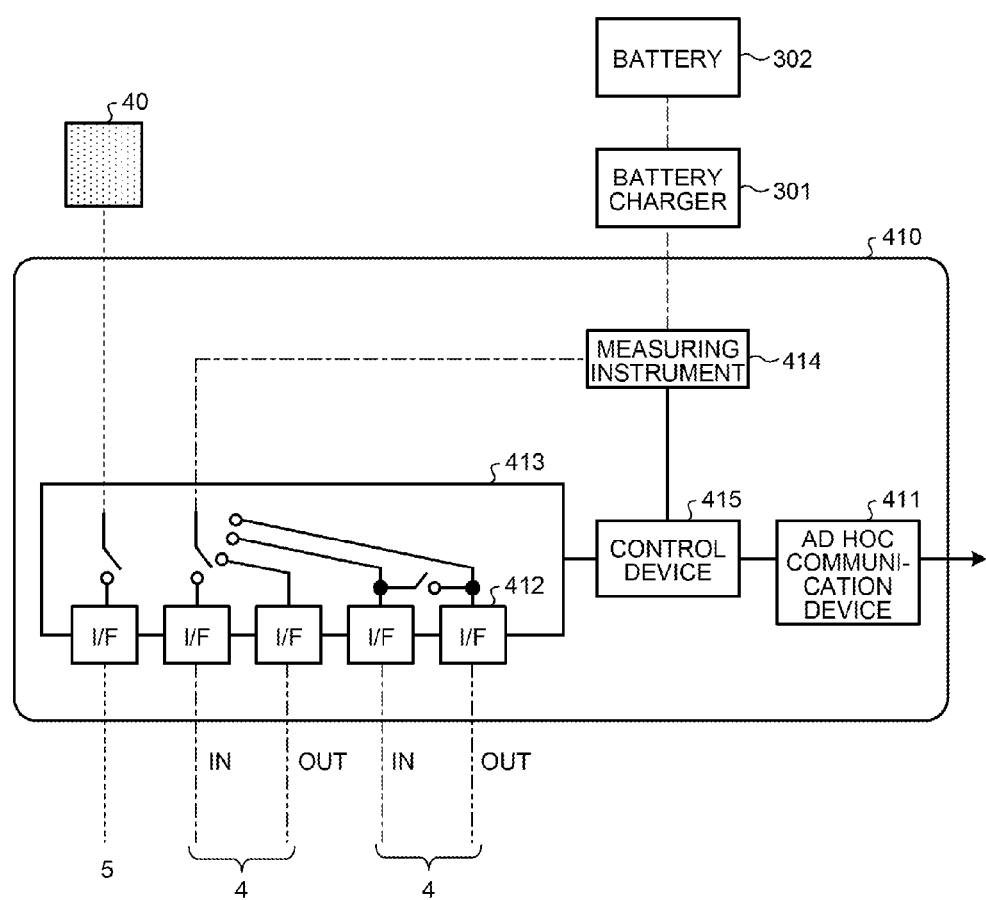
FIG. 21 is a block diagram illustrating the configuration of an electrical power storage station.

In the following, the configuration of the electrical power storage station 410 will be described with reference to FIG. 21. FIG. 21 is a block diagram illustrating the configuration of an electrical power storage station. As illustrated in FIG. 21, the electrical power storage station 410 includes an ad hoc communication device 411, interfaces 412, a splitter 413, a measuring instrument 414, and a control device 415. The ad hoc communication device 411 constructs a network with another electrical power storage station and performs communication, via this network, to exchange information related to the available supply amount. The interface 412 is a connecting unit that is connected to the stored electrical power transmission network 4, the electrical substation 40, and the general electrical power transmission network 5. The splitter 413 switches the connection between the side with a battery 302 and the side with the other electrical power storage station 30. The measuring instrument 414 measures the amount of stored electrical power via a battery charger 301. The control device 415 has the same function as that performed by the control device 260 in the smart meter 200 described in the first embodiment.

Figures 22, 23:
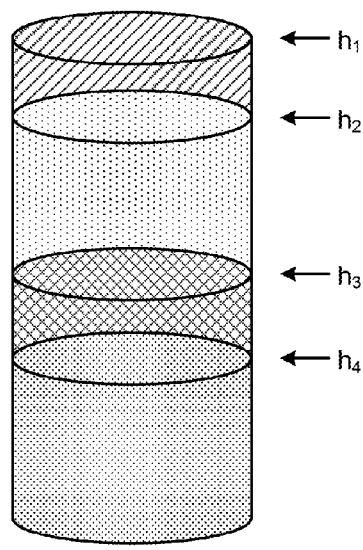
FIG. 22 is a schematic diagram illustrating an example of path information according to the second embodiment.
FIG. 23 is a schematic diagram used for explaining an available supply amount.

The control device 415 includes path information in which the available amount of the other electrical power storage station is associated with the distance between the subject and the other electrical power storage station. Similarly to the first embodiment, the path information illustrated in FIG. 22 is created by the control device 415 based on information that is included in a packet exchanged between the electrical power storage stations. FIG. 22 is a schematic diagram illustrating an example of path information according to the second embodiment. As illustrated in FIG. 22, the path information included in the control device 415 stores therein, in an associated manner, the base location name, the available supply amount, and the distance (hop count). In FIG. 22, "storage 1", "storage 2", "storage 3", and "storage 4" are stored as the base location name in which information is uniquely attached to each of the electrical power storage stations to identify the electrical power storage stations illustrated in FIG. 20. Furthermore, in FIG. 22, the path information stores therein, for each base location name, the distance (hop count), which is the evaluation value related to the electrical power transmission load of the other electrical power storage station. For example, the distance "8" is stored in the "storage 1". The electrical power transmission load increases as the distance increases. Furthermore, in FIG. 22, the path information stores therein, for each base location name, the available supply amount that is the available amount of electrical power supplied to the other electrical power storage station. For example, "100,000 (milliampere/hour)" is stored in the "storage 1". In the following, the available supply amount will be described with reference to FIG. 23.

FIG. 23 is a schematic diagram used for explaining an available supply amount. The cylinder illustrated in FIG. 23 indicates the amount of stored electrical power in the battery 302 in the electrical power storage station 410. the amount of stored electrical power $h_1$ illustrated in FIG. 23 indicates the maximum amount of electrical power that can be stored, in the battery 302, by the electrical power storage station 410. The reference amount of stored electrical power $h_2$ illustrated in FIG. 23 indicates the maximum amount of electrical power consumed at all of the homes that are managed by and connected to the electrical power storage station 410 via the stored electrical power transmission network 4. The threshold $h_3$ illustrated in FIG. 23 indicates the amount of electrical power that is used as a trigger when a process for requesting electrical power to be transmitted to the other electrical power storage station is performed. The critical section $h_4$ illustrated in FIG. 23 indicates the amount of electrical power, where the electrical power storage station 410 does not perform its function. The available supply amount corresponds to the amount of electrical power remaining when the reference amount of stored electrical power $h_2$ is subtracted from the amount of stored electrical power $h_1$. Specifically, even if electrical power is supplied to all of the homes that are managed by and connected to the electrical power storage station 410, the available supply amount corresponds to the amount of electrical power remaining in the battery 302 included in the electrical power storage station 410. In the following, the operation of the control device 415 will be described with reference to FIG. 23.

For example, the control device 415 monitors the amount of stored electrical power in the battery 302 and detects the time point at which the amount of stored electrical power becomes less than the threshold $h_3$ illustrated in FIG. 23. If the amount of stored electrical power in the battery 302 becomes less than threshold $h_3$, the control device 415 determines whether electrical power is being supplied from the battery 302 to a home that is managed by and connected to the electrical power storage station 410 when the amount of stored electrical power is less than the threshold $h_3$. If the determination result indicates that electrical power is being supplied to a home that is managed by and connected to the electrical power storage station 410, the control device 415 continues to supply the electrical power, continues to monitor the amount of stored electrical power in the battery 302, and then detects the time point at which the amount of stored electrical power becomes less than the critical section $h_4$ illustrated in FIG. 23. If the amount of stored electrical power becomes less than the critical section $h_4$, the control device 415 switches the electrical power supplied to a given home that is managed by and connected to a given electrical power storage station to the electrical power supplied from the electrical power plant 10 when the amount of stored electrical power becomes less than the critical section $h_4$. At this point, the control device 415 instructs the home that supplies the electrical power to switch the supply of electrical power from the electrical power plant 10.

Furthermore, when the amount of stored electrical power becomes less the threshold $h_3$ illustrated in FIG. 23, if electrical power is not being supplied from the control device 415 to a given home that is managed by and connected to a given electrical power storage station, the control device 415 receives an electrical power supply from the other electrical power storage station such that electrical power can be stored up to the reference amount of stored electrical power $h_2$ illustrated in FIG. 23. For example, the control device 415 refers to the path information illustrated in FIG. 22 and searches for another electrical power storage station whose available supply amount satisfies the reference amount of stored electrical power $h_2$. For example, it is assumed that each of the storage 2 and the storage 4 satisfies, as the electrical power storage station, the reference amount of stored electrical power $h_2$. At this point, the control device 415 selects, between the storage 2 and the storage 4, the closest electrical power storage station and sends a request for an electrical power supply. Then, the control device 415 determines whether permission to supply the electrical power is received from the electrical power storage station that is the destination of the request for the electrical power supply.

If the determination result indicates that the control device 415 receives a response indicating that an electrical power supply is permitted, the control device 415 changes the connection configuration of the switches such that electrical power is supplied from an electrical power storage station functioning as the supply source of the electrical power. Then, the control device 415 stores the electrical power transmitted from the electrical power storage station, which is the supply source of the electrical power, in the battery 302 via the battery charger 301 until the amount of the electrical power reaches the reference amount of stored electrical power $h_2$. In contrast, if the determination result indicates that the control device 415 receives a response indicating that an electrical power supply is not permitted, the control device 415 selects, from among the detected electrical power storage stations that satisfy the reference amount of stored electrical power $h_2$, an electrical power storage station that is the second closest station. For example, if the storage 2 and the storage 4 are electrical power storage stations that satisfy the reference amount of stored electrical power $h_2$, the control device 415 selects the storage 4.

Furthermore, from among the detected electrical power storage stations that satisfy the reference amount of stored electrical power $h_2$, if the control device 415 does not detect the second closest electrical power storage station, the control device 415 searches the path information illustrated in FIG. 22 for an electrical power storage station that satisfies the search condition in which an electrical power storage station having the maximum value of "available supply amount/distance" is selected from among the electrical power storage stations that satisfy "available supply amount/distance>threshold P". It is assumed that a value is previously set to the threshold P. The value used for the threshold P is a value of the amount of stored electrical power at an electrical power storage station is not below the reference amount of stored electrical power of the electrical power storage station even if the electrical power stored in the electrical power storage station is supplied to the other electrical power storage station until the amount of stored electrical power in the other electrical power storage station reaches the reference amount of stored electrical power.

If the control device 415 detects an electrical power storage station that satisfies the above described search condition, the control device 415 requests electrical power to be supplied from the detected electrical power storage station by an available supply amount and stores the electrical power up to the reference amount of stored electrical power $h_2$.

Figure 24:
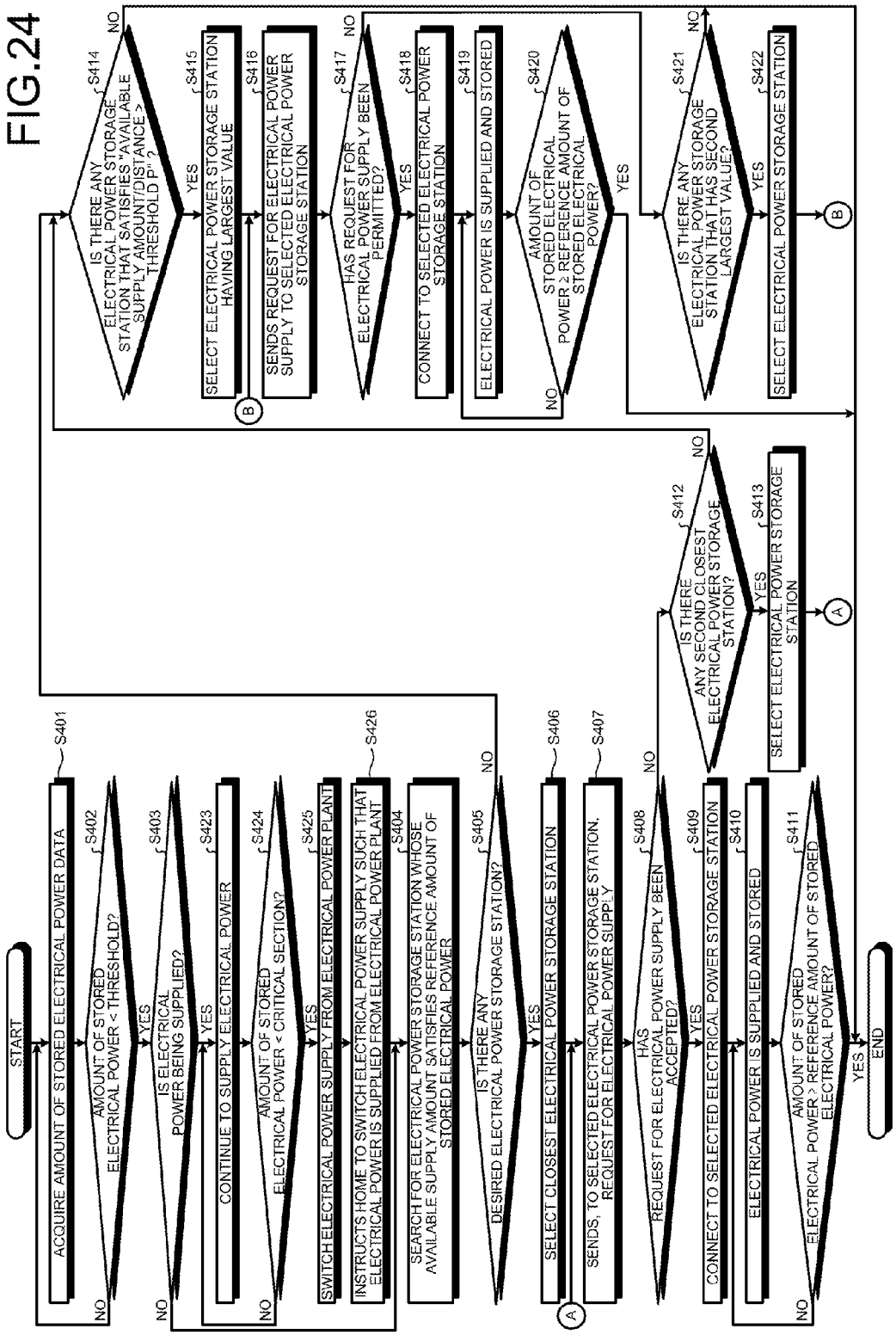
FIG. 24 is a flowchart illustrating the flow of a process performed by an electrical power storage station according to the second embodiment.

Process Performed by an Electrical Power Storage Station in the Second Embodiment In the following, the flow of a process performed by an electrical power storage station will be described with reference to FIG. 24. FIG. 24 is a flowchart illustrating the flow of a process performed by an electrical power storage station according to the second embodiment. The process illustrated in FIG. 24 is performed when the electrical power storage station is running.

As illustrated in FIG. 24, the control device 415 acquires the amount of stored electrical power data (Step S401), the control device 415 determines whether the amount of stored electrical power is less than the threshold (Step S402). For example, the control device 415 detects a time point at which the amount of stored electrical power becomes less than the threshold $h_3$ illustrated in FIG. 23.

If the amount of stored electrical power is equal to or greater than the threshold (No at Step S402), the control device 415 returns to Step S401 described above. In contrast, if the amount of stored electrical power is less than the threshold (Yes at Step S402), the control device 415 determines whether electrical power is being supplied from the battery 302 to the home that is managed by and connected to the electrical power storage station (Step S403). If the determination result indicates that electrical power is not being supplied to the home that is managed by and connected to the electrical power storage station (No at Step S403), the control device 415 refers to the path information and searches for an electrical power storage station whose available supply amount satisfies the reference amount of stored electrical power (Step S404). For example, the control device 415 searches for an electrical power storage station whose available supply amount is sufficient for supplying electrical power up to the reference amount of stored electrical power $h_2$ illustrated in FIG. 23. After the searching performed at Step S404, if the control device 415 searches for the desired electrical power storage stations (Yes at Step S405), the control device 415 selects, from among the detected electrical power storage stations, the closest electrical power storage station (Step S406). Then, the control device 415 sends, to the selected electrical power storage station, a request for an electrical power supply (Step S407). Subsequently, the control device 415 waits a determination indicating whether electrical power will be supplied from the electrical power storage station that is the destination of the request for the electrical power supply (Step S408). If the electrical power storage station, which is the destination of the request for the electrical power supply, permits the request for the electrical power supply (Yes at Step S408), the control device 415 changes the connection configuration of the switch such that electrical power is supplied from the electrical power storage station selected as the destination of the request for the electrical power supply (Step S409). Subsequently, the control device 415 starts to store the electrical power (Step S410), monitors the amount of stored electrical power, and detects a time point at which the amount of stored electrical power becomes equal to or greater than the reference amount of stored electrical power (Step S411). If the amount of stored electrical power is less than the reference amount of stored electrical power (No at Step S411), the control device 415 returns to Step S410 and continues to store electric power. In contrast, if the amount of stored electrical power becomes equal to or greater than the reference amount of stored electrical power (Yes at Step S411), the control device 415 ends the process.

At Step S408 described above, if the electrical power storage station, which is the destination of the request for the electrical power supply, does not permit the request for the electrical power supply (No at Step S408), the control device 415 performs the process as follows. Namely, if the control device 415 detects multiple electrical power storage stations at Step S405, the control device 415 attempts to detect an electrical power storage station that is the second closest station that has been selected at Step S406 (Step S412). If the control device 415 detects the second closest electrical power storage station (Yes at Step S412), the control device 415 selects the detected electrical power storage station (Step S413) and proceeds to Step S407 described above. In contrast, if the control device 415 does not detect the second closest electrical power storage station (No at Step S412), the control device 415 refers to the path information and searches for an electrical power storage station that satisfies the condition "available supply amount/distance>threshold P" (Step S414).

If the control device 415 detects electrical power storage stations that satisfy the condition "available supply amount/distance>threshold P" (Yes at Step S414), the control device 415 selects, from among the detected electrical power storage stations, an electrical power storage station having the maximum value of "available supply amount/distance" (Step S415). Subsequently, the control device 415 sends a request for an electrical power supply to the selected electrical power storage station (Step S416). Then, the control device 415 waits for the determination indicating whether electrical power can be supplied from the electrical power storage station, which is the destination of the request for the electrical power supply (Step S417). If the electrical power storage station, which is the destination of the request for the electrical power supply, permits the electrical power supply request (Yes at Step S417), the control device 415 changes the connection configuration of the switches such that electrical power can be supplied from among the electrical power storage stations selected as the destination of the request for the electrical power supply (Step S418). Then, the control device 415 starts to store the electrical power in response to the supply of the electrical power (Step S419), monitors the amount of stored electrical power, and detects a time point at which the amount of stored electrical power becomes equal to or greater than the reference amount of stored electrical power (Step S420). If the amount of stored electrical power is less than the reference amount of stored electrical power (No at Step S420), the control device 415 returns to Step S419 and continues to store the electrical power. In contrast, if the amount of stored electrical power becomes equal to or greater than the reference amount of stored electrical power (Yes at Step S420), the control device 415 ends the process.

At Step S417 described above, if the electrical power storage station, which is the destination of the request for the electrical power supply, does not permit the electrical power supply request (No at Step S417), the control device 415 performs the process as follows. Namely, if the control device 415 detects multiple electrical power storage stations at Step S414, the control device 415 attempts to detect an electrical power storage station having the second largest value of "available supply amount/distance" after the electrical power storage station selected at Step S415 (Step S421). If the control device 415 detects the second closest electrical power storage station (Yes at Step S421), the control device 415 selects the detected electrical power storage station (Step S422) and proceeds to Step S416 described above. In contrast, if the control device 415 does not detect the second closest electrical power storage station (No at Step S421), the control device 415 ends the process without processing anything.

Furthermore, at Step S414 described above, if the control device 415 does not detect the electrical power storage station that satisfies "available supply amount/distance>threshold P" (No at Step S414), the control device 415 ends the process without processing anything.

Furthermore, at Step S405 described above, if the control device 415 does not detect the desired electrical power storage station (No at Step S405), the control device 415 moves to Step S414 described above.

Furthermore, at Step S403 described above, if the determination result indicates that electrical power is being supplied to a home that is managed by and connected to the electrical power storage station (Yes at Step S403), the control device 415 continues to supply the electrical power (Step S423). Then, the control device 415 continues to monitor the amount of stored electrical power in the battery 302 and detects a time point at which the amount of stored electrical power is less than the critical section (Step S424). For example, the control device 415 detects a time point at which the amount of stored electrical power is less than the critical section $h_4$ illustrated in FIG. 23. If the amount of stored electrical power is equal to or greater than the critical section (No at Step S424), the control device 415 returns to Step S423. In contrast, if the amount of stored electrical power is less than the critical section (Yes at Step S424), the control device 415 switches a supply of the electrical power to the home, which is managed by and connected to the electrical power storage station, to a supply of the electrical power from the electrical power plant 10 (Step S425). Then, the control device 415 instructs the home, to which electrical power is supplied, to switch the electrical power supply such that the electrical power is supplied from the electrical power plant 10 (Step S426) and then moves to Step S404 described above.

Advantage of the Second Embodiment

As described above, with the electrical power storage stations according to the second embodiment, if the amount of stored electrical power of a subject electrical power storage station becomes less than the predetermined value, the subject electrical power storage station receives an electrical power supply from the closest electrical power storage station from among the other electrical power storage stations that can supply electrical power to the subject electrical power storage station up to the reference amount of stored electrical power. Consequently, according to the second embodiment, it is possible to implement the stable supply of electrical power to each home that is managed by and connected to an electrical power storage station while reducing an electrical power loss when electrical power is transmitted.

Furthermore, with the electrical power storage stations according to the second embodiment, if the subject electrical power storage station is not able to detect the other electrical power storage station that can supply electrical power to the subject electrical power storage station up to the reference amount of stored electrical power, electrical power is supplied from the electrical power storage station whose available supply amount is sufficient and that is the closest to the subject electrical power storage station. Consequently, according to the second embodiment, it is possible to avoid a sudden power failure as much as possible.

[c] Third Embodiment

In the following, a description will be given of another embodiment of the electrical power control device, the electrical power control program, and the electrical power control method disclosed in the present invention.

(1) Configuration of the Devices, Etc.

For example, the configuration of the control device 260 illustrated in FIG. 4 is only for conceptually illustrating the function thereof and is not always physically configured as illustrated in the drawings. For example, the selecting unit 262, the sending/receiving unit 263, and the path information creating unit 264 in the control device 260 illustrated in FIG. 4 may also be functionally or physically integrated. By doing so, all or part of the control device 260 illustrated in FIG. 4 may also be configured by functionally or physically separating or integrating any of the units depending on various loads or use conditions.

(2) Electrical Power Control Program

Figure 25:
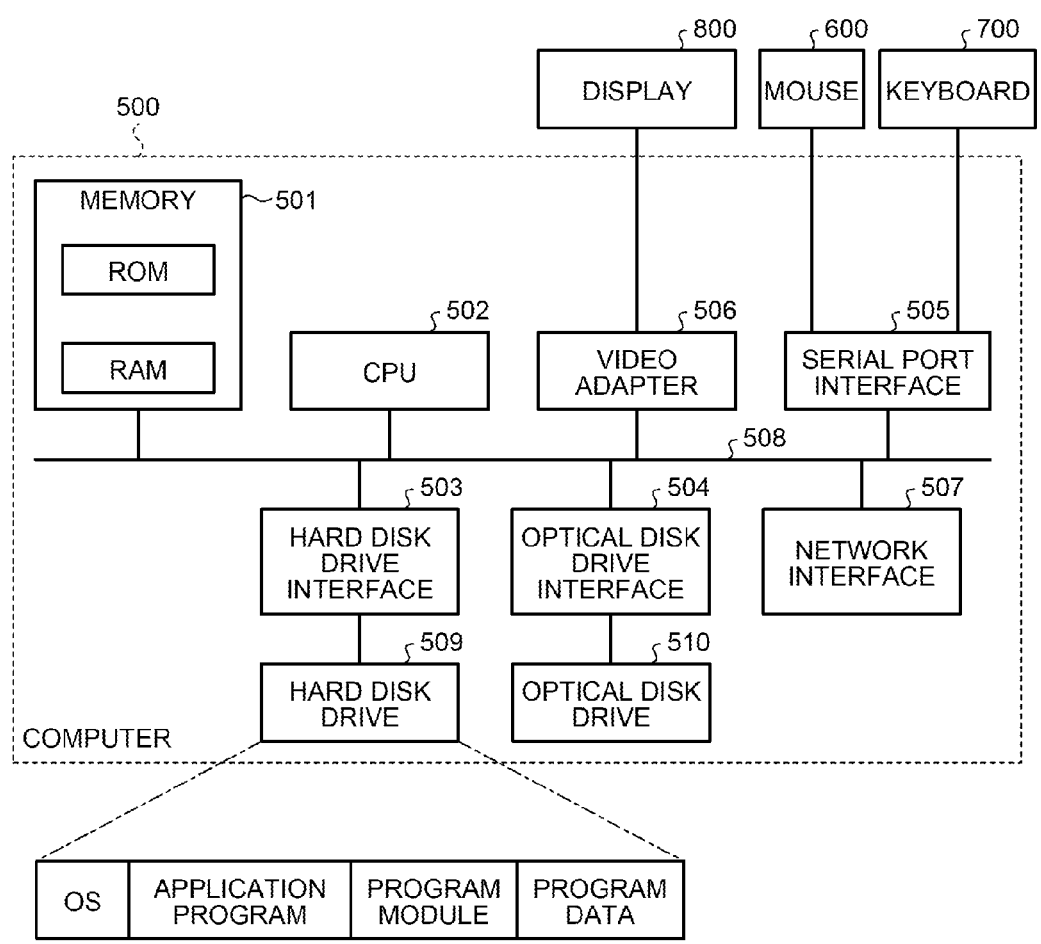
FIG. 25 is a schematic diagram illustrating an example of a computer that executes an electrical power control program.
Figure 26:
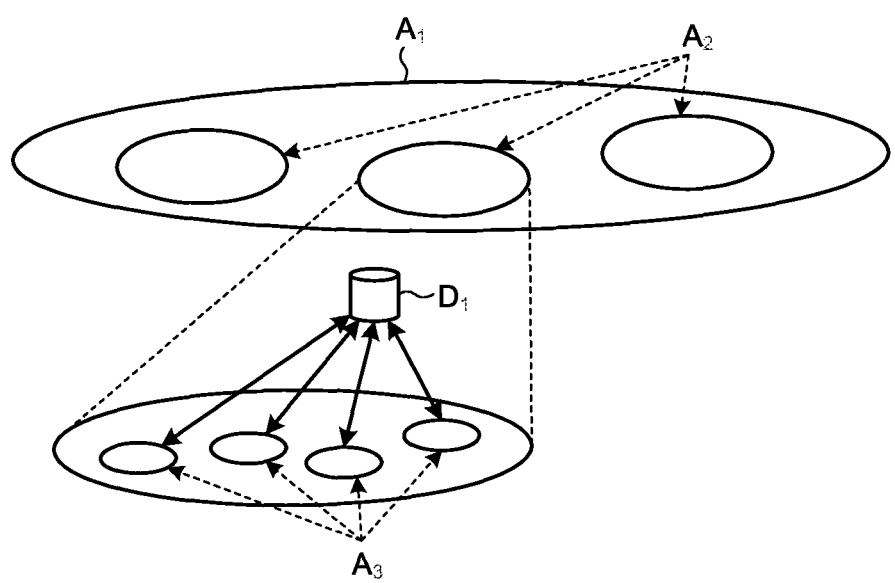
FIG. 26 is a schematic diagram illustrating an example of an electrical power network.

The various processes performed by the control device 260 in the smart meter 200 described in the embodiments can be implemented by a program prepared in advance and executed by a computer that includes, for example, an electronic circuit or an integrated circuit. Accordingly, in the following, a computer that executes an electrical power control program having the same function as that performed by the control device 260 in the smart meter 200 described in the above embodiments will be described with reference to FIG. 25. FIG. 25 is a schematic diagram illustrating an example of a computer that executes an electrical power control program.

As illustrated in FIG. 25, a computer 500 includes, for example, a memory 501, and a central processing unit (CPU) 502. Furthermore, as illustrated in FIG. 25, the computer 500 includes a hard disk drive interface 503 and an optical disk drive interface 504. Furthermore, as illustrated in FIG. 25, the computer 500 includes a serial port interface 505, a video adapter 506, and a network interface 507. Each of the units 501 to 507 included in the computer 500 is connected via a bus 508.

As illustrated in FIG. 25, the memory 501 includes a read only memory (ROM) and a random access memory (RAM). The ROM stores therein, for example, a boot program, such as a basic input/output system (BIOS). As illustrated in FIG. 25, the hard disk drive interface 503 is connected to a hard disk drive 509. As illustrated in FIG. 25, the optical disk drive interface 504 is connected to an optical disk drive 510. For example, a detachable storage medium, such as an optical disk, is inserted into the optical disk drive 510. As illustrated in FIG. 25, the serial port interface 505 is connected to, for example, a mouse 600 and a keyboard 700. As illustrated in FIG. 25, the video adapter 506 is connected to, for example, a display 800.

With this configuration, as illustrated in FIG. 25, the hard disk drive 509 stores therein, for example, an operating system (OS), an application program, a program module, and program data.

Specifically, an electrical power control program related to the technology disclosed in the present invention is stored in, for example, the hard disk drive 509 as a program module in which instructions executed by the computer 500 are described. More specifically, the hard disk drive 509 stores therein the program module in which procedures for executing the same processes as those performed by the control device 260 in the smart meter 200 described in the embodiments are described. For example, in this program module, the procedures for executing the same processes as those illustrated in FIGS. 16 to 18 are described.

Data used for the electrical power control program is stored in, for example, the hard disk drive 509 as program data. For example, the program data corresponds to various kinds of information stored in the storing unit 261 described in the above embodiments.

Then, the CPU 502 reads, as needed, the program module or the program data stored in the hard disk drive 509 in the RAM and executes the procedures for performing the same processes described in the above embodiments (FIGS. 16 to 18).

However, the program module or the program data related to the electrical power control program is not always stored in the hard disk drive 509. For example, the program module or the program data may also be stored in, for example, the optical disk drive 510, such as a detachable storage medium.

In such a case, the CPU 502 reads the program module or the program data related to the electrical power control program via the optical disk drive 510. Alternatively, the program module or the program data related to the electrical power control program may also be stored in another computer connected via a network, such as a local area network (LAN) or a wide area network (WAN). In such a case, the CPU 502 reads, from the computer via the network interface 507, the program module or the program data related to the electrical power control program.

Instead of using the CPU 502 that performs various processes due to the program, it may also possible to perform the process by using, for example, an electronic circuit, such as an application specific integrated circuit (ASIC) or a field programmable gate array (FPGA). Furthermore, a flash memory or the like may also be used as the memory 501.

According to one aspect of a communication control device discussed in the above embodiments, a request for electrical power transmission and the switching (controlling the on/off state of switches) are simultaneously performed. Consequently, a prompt electrical power supply is possible, thus reducing an electrical power loss when electrical power is transmitted.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electrical power control device that is installed in each location in which an electric power generation facility and an electrical power storage facility are provided, the electrical power control device comprising:
    a memory; and
    a processor coupled to the memory, wherein the processor executes a process including:
    storing therein, in an associated manner for each location connected by using an electrical power transmission network and a communication network, an evaluation value related to the electrical power transmission load of another location and the electrical power balance in the other location;
    selecting, based on the evaluation value and the electrical power balance stored in a storage when the electrical power balance in a subject location is less than a predetermined threshold, another location as a request destination of electrical power transmission, the selecting including turning a switch on/off in accordance with a determination of the request destination; and
    sending, to the other location selected at the selecting via the communication network, a request indicating that electrical power needs to be transmitted, via the electrical power transmission network, from the other location to the subject location.

2. The electrical power control device according to claim 1, wherein
    the storing includes storing therein, as the evaluation value, a hop count, which is the number of electrical power control devices installed in locations that are located on a connection path between the subject location and the other location, or stores therein, as the evaluation value, location information on an electrical power control device installed in the other location, and
    when the electrical power balance of the subject location is less than the predetermined threshold, the selecting includes selecting, from among the locations other than the subject location and based on the hop count or the location information stored in the storage, an electrical power control device whose electrical power balance is positive and that is installed in a location closest to the subject location.

3. The electrical power control device according to claim 1, wherein
    the storing includes storing therein, as the evaluation value, the difference between a voltage value when electrical power is transmitted from an electrical power control device installed in the other location and a voltage value in the subject location when electrical power was received from the other location, and
    when the electrical power balance in the subject location is less than the predetermined threshold, the selecting includes selecting, based on voltage values stored in the storage and from among the locations other than the subject location, a location in which an electrical power control device is installed whose electrical power balance is positive and that also includes the voltage value with the smallest difference between the voltage value in the subject location and those in the locations other than the subject location.

4. The electrical power control device according to claim 1, wherein
    the process further includes transferring, when a request for electrical power transmission whose destination is the electrical power control device installed in the other location is received, the request to the destination.

5. The electrical power control device according to claim 2, wherein
    the process further includes transferring, when a request for electrical power transmission whose destination is the electrical power control device installed in the other location is received, the request to the destination.

6. The electrical power control device according to claim 3, wherein a packet that is used as notification of the electrical power balance that includes the amount of electrical power consumption, the amount of generated electrical power, and the amount of stored electrical power in the subject location is sent to the electrical power control device installed in the other location.

7. The electrical power control device according to claim 4, wherein, when a packet that is used as notification of the electrical power balance that includes the amount of electrical power consumption, the amount of generated electrical power, and the amount of stored electrical power in the subject location is sent, the sending includes inserting, into the packet, information on the electrical power balance that includes the amount of electrical power consumption, the amount of generated electrical power, and the amount of stored electrical power in the other location and that is included in a packet already received from the electrical power control device installed in the other location and then sends the packet to the other location.

8. The electrical power control device according to claim 5, wherein, when a packet that is used as notification of the electrical power balance that includes the amount of electrical power consumption, the amount of generated electrical power, and the amount of stored electrical power in the subject location is sent, the sending includes inserting, into the packet, information on the electrical power balance that includes the amount of electrical power consumption, the amount of generated electrical power, and the amount of stored electrical power in the other location and that is included in a packet already received from the electrical power control device installed in the other location and then sends the packet to the other location.

9. A non-transitory computer-readable recording medium having stored therein a program that causes a computer that is used as an electrical power control device and that is installed in each location in which an electric power generation facility and an electrical power storage facility are provided, the program that causes the computer to execute an electrical power control process comprising:

referring to, when the electrical power balance in a subject location is less than a predetermined threshold, a storage that stores therein, in an associated manner for each location connected by using an electrical power transmission network and a communication network, an evaluation value related to the electrical power transmission load of another location and the electrical power balance in the other location;

selecting, based on the evaluation value and the electrical power balance stored in the storage, another location as a request destination of electrical power transmission, the selecting including turning a switch on/off in accordance with a determination of the request destination; and sending, via the communication network to the other location selected at the selecting, a request indicating that electrical power needs to be transmitted, via the electrical power transmission network, from the other location to the subject location.

10. An electrical power control method performed by a computer that is used as an electrical power control device and that is installed in each location in which an electric power generation facility and an electrical power storage facility are provided, the electrical power control method comprising:

referring to, when the electrical power balance in a subject location is less than a predetermined threshold, a storage that stores therein, in an associated manner for each location connected by using an electrical power transmission network and a communication network, an evaluation value related to the electrical power transmission load of another location and the electrical power balance in the other location, using a processor coupled to the storage;

selecting, based on the evaluation value and the electrical power balance stored in the storage, another location as a request destination of electrical power transmission, using the processor, the selecting including turning a switch on/off in accordance with a determination of the request destination; and sending, via the communication network to the other location selected at the selecting, a request indicating that electrical power needs to be transmitted, via the electrical power transmission network, from the other location to the subject location, using the processor.

* * * * *